United States Patent [19]

Ozawa et al.

[11] Patent Number: 5,515,430
[45] Date of Patent: May 7, 1996

[54] VOLUME CONTROLLER

[75] Inventors: Isamu Ozawa, Hachioji; Shigeki Sakurai, Yokohama, both of Japan

[73] Assignee: Canon Kabushiki Kaisha, Tokyo, Japan

[21] Appl. No.: 456,487

[22] Filed: Jun. 1, 1995

Related U.S. Application Data

[63] Continuation of Ser. No. 750,112, Aug. 26, 1991, abandoned.

[30] Foreign Application Priority Data

| Aug. 28, 1990 | [JP] | Japan | 2-225764 |
| Aug. 28, 1990 | [JP] | Japan | 2-226995 |
| Aug. 28, 1990 | [JP] | Japan | 2-227000 |
| Nov. 19, 1990 | [JP] | Japan | 2-314955 |

[51] Int. Cl.⁶ .............................................. H04M 11/00
[52] U.S. Cl. .................. 379/350; 379/399; 379/63; 379/88; 370/30; 370/24
[58] Field of Search ...................... 379/350, 399, 379/63, 88; 381/56, 58; 370/30, 24, 29, 32

[56] References Cited

U.S. PATENT DOCUMENTS

| 4,577,067 | 3/1986 | Levy et al. | 379/88 |
| 4,773,080 | 9/1988 | Nakajima et al. | 379/90 |
| 4,947,483 | 8/1990 | Dirr | 370/30 |
| 4,955,071 | 2/1991 | Weber et al. | 379/53 |
| 5,034,948 | 7/1991 | Mizutani et al. | 379/93 |
| 5,070,524 | 12/1991 | Mano | 379/165 |

FOREIGN PATENT DOCUMENTS 1212169  9/1989  Japan.

*Primary Examiner*—Jeffrey A. Hofsass
*Assistant Examiner*—Jacques M. Saint-Surin
*Attorney, Agent, or Firm*—Fitzpatrick, Cella, Harper & Scinto

[57] ABSTRACT

A telephone exchange operating on a volume controller provided with functions for inputting digitized speech data and volume control data, and converting a volume of the inputted speech data. A talker's sound inputted from a first channel has the volume converted and is outputted to a second channel for outputting a listener's sound. A volume of the speech data is converted according to a volume control data and exchanged. An augmenter for a sound level is calculated according to a reference signal sent from a first circuit to a second circuit.

19 Claims, 23 Drawing Sheets

FIG. 6

| PCM SIGN PATTERN<br>1 2 3 4 5 6 7 8 | OUTPUT LEVEL |
|---|---|
| 1 0 0 0 0 0 0 0 | 8031 |
| 1 0 0 0 0 0 0 1 | 7775 |
| 1 0 0 0 0 0 1 0 | 7519 |
| 1 0 0 0 0 0 1 1 | 7263 |
| . | . |
| . | . |
| . | . |
| 1 1 1 0 1 1 1 0 | 37 |
| 1 1 1 0 1 1 1 1 | 33 |
| 1 1 1 1 0 0 0 0 | 30 |
| 1 1 1 1 0 0 0 1 | 28 |
| 1 1 1 1 0 0 1 0 | 26 |
| 1 1 1 1 0 0 1 1 | 24 |
| 1 1 1 1 0 1 0 0 | 22 |
| 1 1 1 1 0 1 0 1 | 20 |
| 1 1 1 1 0 1 1 0 | 18 |
| 1 1 1 1 0 1 1 1 | 16 |
| 1 1 1 1 1 0 0 0 | 14 |
| 1 1 1 1 1 0 0 1 | 12 |
| 1 1 1 1 1 0 1 0 | 10 |
| 1 1 1 1 1 0 1 1 | 8 |
| 1 1 1 1 1 1 0 0 | 6 |
| 1 1 1 1 1 1 0 1 | 4 |
| 1 1 1 1 1 1 1 0 | 2 |
| 1 1 1 1 1 1 1 1 | 0 |
| 0 1 1 1 1 1 1 1 | 0 |
| 0 1 1 1 1 1 1 0 | −2 |
| . | . |
| . | . |

FIG. 14

| ADDRESS | | |
|---|---|---|
| | 0 | TONE 1 - (1) |
| | 1 | TONE 2 - (1) |
| | 2 | TONE 3 - (1) |
| | ⋮ | ⋮ |
| | 29 | +3dB INDICATING SIGNAL - (1) |
| | 30 | +6dB INDICATING SIGNAL |
| | 31 | +9dB INDICATING SIGNAL |
| | 32 | TONE 1 - (2) |
| | 33 | TONE 2 - (2) |
| | 34 | TONE 3 - (2) |
| | ⋮ | ⋮ |
| | 61 | +3dB INDICATING SIGNAL - (2) |
| | 62 | +6dB INDICATING SIGNAL |
| | 63 | +9dB INDICATING SIGNAL |
| | ⋮ | ⋮ |
| | 25600 | TONE 1 - (800) |
| | 25601 | TONE 2 - (800) |
| | 25602 | TONE 3 - (800) |
| | ⋮ | ⋮ |
| | 25629 | +3dB INDICATING SIGNAL - (800) |
| | 25630 | +6dB INDICATING SIGNAL |
| | 25631 | +9dB INDICATING SIGNAL |

VOLUME CONTROLLER

This application is a continuation of application Ser. No. 07/750,112 filed Aug. 26, 1991, now abandoned.

BACKGROUND OF THE INVENTION

1. Field of the Invention

This invention relates to a volume controller for controlling outputting of a volume of an inputted voice.

2. Related Background Art

A gain control of an exchange is performed hitherto according to a construction shown in FIG. 1. FIG. 1 then represents a construction of a prior art digital private branch exchange.

In FIG. 1, a reference numeral 81 denotes an exchange, 82 denotes a control portion thereof, 83 denotes a time switch, 84 denotes a timing circuit, 85 denotes a station line interface, 86 denotes a PCM codec, 87 denotes an operational amplifier, 88 denotes a gain change-over switch, 89 denotes an extension interface, 90 denotes a forward PCM highway, 91 denotes a backward PCM highway, 92 denotes a telephone network, 93 denotes an exchange, and 94 denotes a 2/4 line converting portion.

Here, an analog signal from the telephone network 92 has been subjected so far to gain control by modifying a resistance value connected to the operational amplifier 87 on the change-over switch 88 according to a control from the control portion 82. Then, such gain control is carried out likewise in the case of an extension interface and other circuit interface.

However, since a gain control is effected at every circuit in the above-described prior art, a defect is quite unavoidable such that a multitude of circuits must be controlled according particularly as the circuits increase in number, thus complicating hardware structurally.

SUMMARY OF THE INVENTION

It is an object of this invention to simplify a volume controlling circuit configuration in a volume controller or a telephone exchange.

It is another object of this invention to provide a volume controller or a telephone exchange and a telephone data channel superior in operating efficiency.

It is a further object of this invention to enhance a reliability of a volume controller or a telephone exchange.

Other and further objects of this invention will become obvious upon understanding of the illustrative examples and the accompanying drawings.

BRIEF DESCRIPTION OF THE DRAWINGS

FIG. 6 is a table showing a relation between a PCM sign pattern and a level;

FIG. 14 is a tone memory map of the embodiment of FIG. 11;

DETAILED DESCRIPTION OF THE PREFERRED EMBODIMENTS

The invention will now be described in detail with reference to preferred embodiments given in the accompanying drawings.

Figure 1:
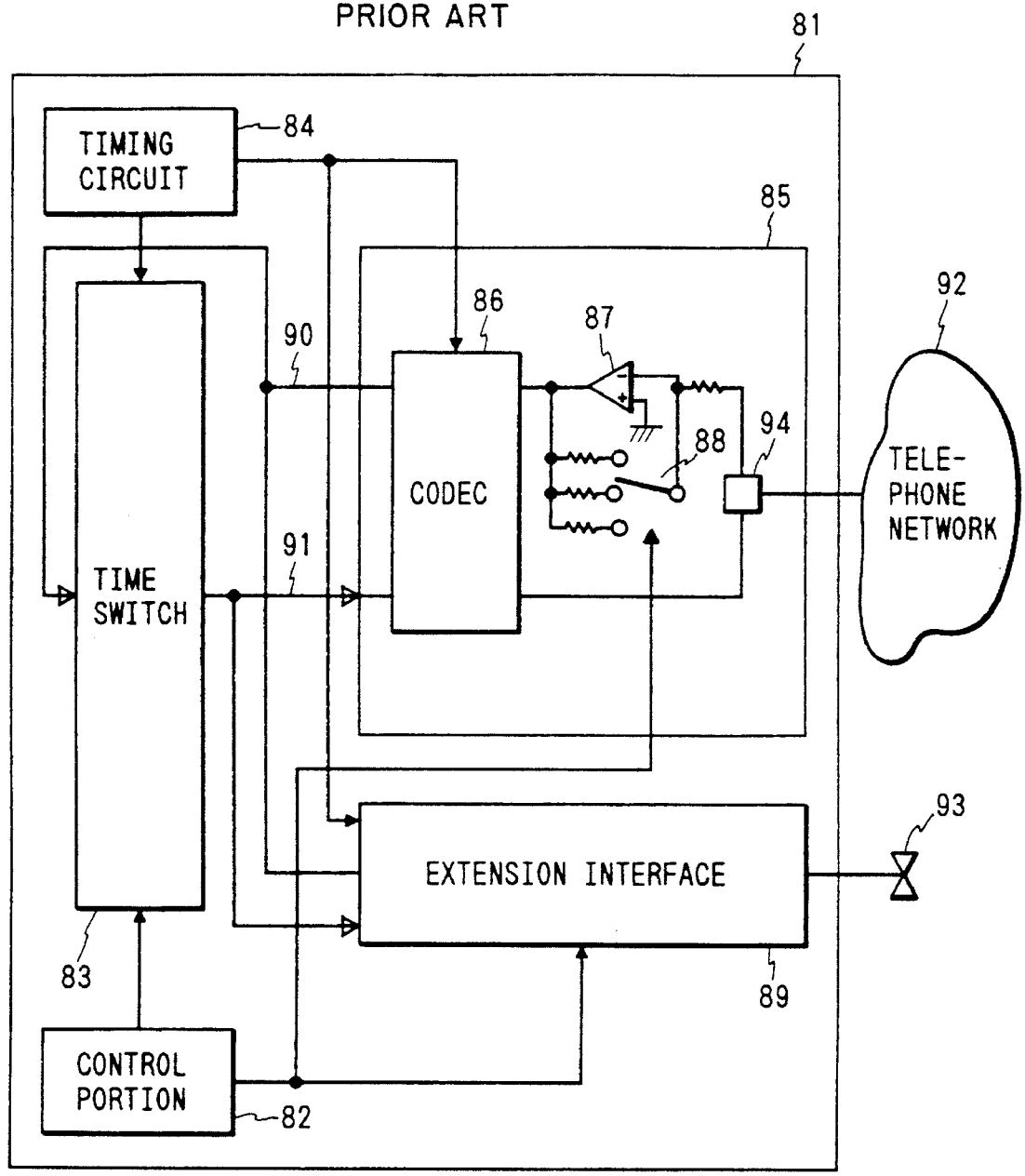
FIG. 1 is a block diagram of a prior art exchange.
Figure 2:
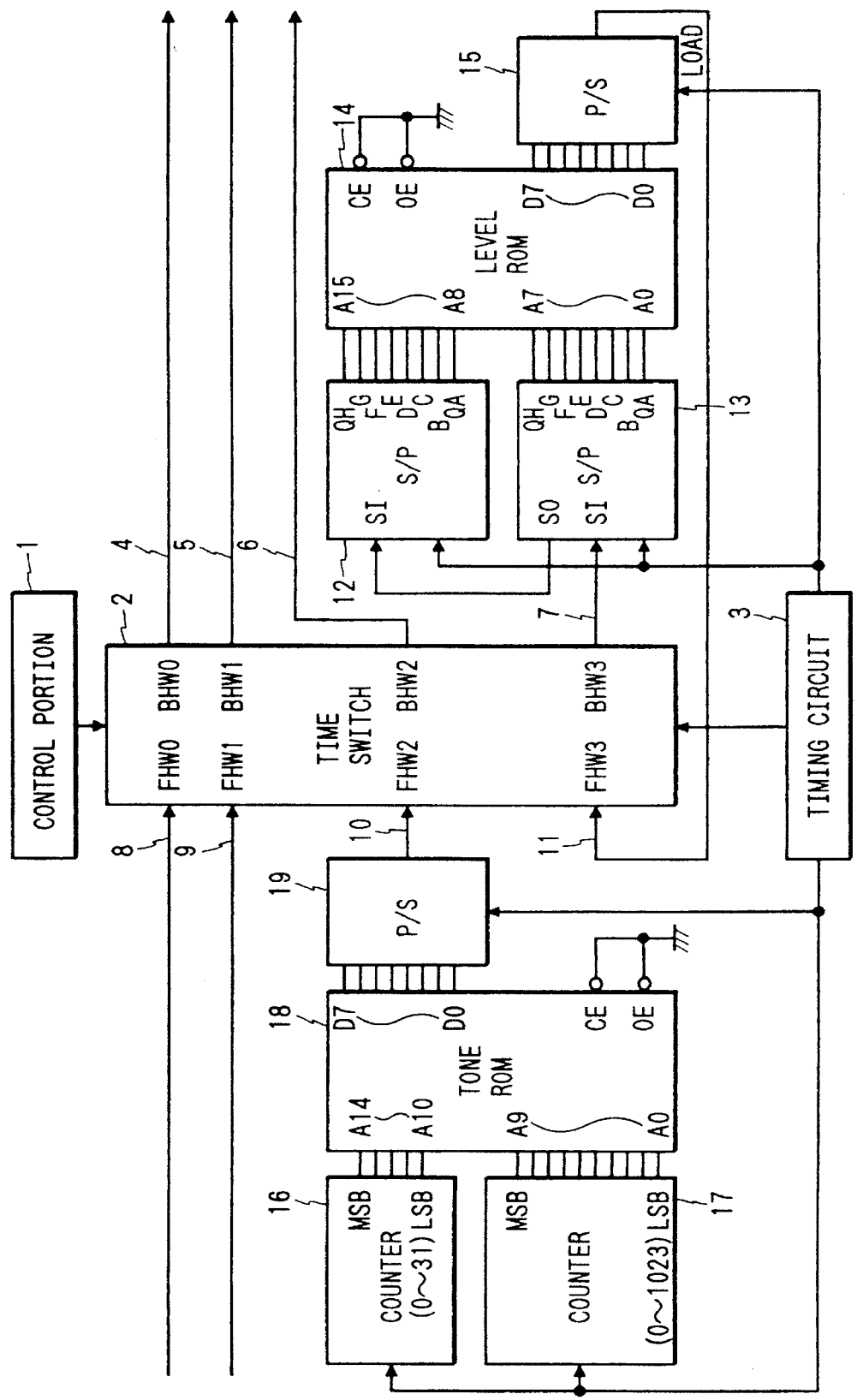
FIG. 2 is a block diagram of an exchange main part given in one embodiment of this invention.

FIG. 2 represents a configuration of a time switch and its periphery of a PCM data exchange portion of a digital exchange according to the invention. Other portions of the exchange are constructed similarly to FIG. 1.

In FIG. 2, a reference numeral 1 denotes a control portion for controlling a time switch 2, 2 denotes a time switch for exchanging PCM data, 3 denotes a timing circuit for sending a timing signal to the time switch 2 and its periphery.

Reference numerals 4, 5, 6, 7 denote backward PCM highways (BHW0, BHW1, BHW2, BHW3) from the time switch 2 respectively, 8, 9, 10, 11 denote forward PCM highways (FHW0, FHW1, FHW2, FHW3) inputted to the time switch 2 respectively.

Reference numerals 12, 13 denote cascaded serial-parallel converters with an output latch (74HC595, for example), which convert a serial PCM data of the backward PCM highway 7 (BHW3) into a parallel data according to a timing signal of the timing circuit 3, and latches two continuous time slot PCM data on an output latch.

A reference numeral 14 denotes a level ROM for inputting a parallel latch output from the serial-parallel converters 12, 13 with output latch as an address data, and outputting data to PCM data written in the address on a data line.

A reference numeral 15 denotes a parallel-serial converter (74HC166, for example) for converting a parallel PCM data from the level ROM 14 into serial data according to a timing signal of the timing circuit 3, and sending to the forward PCM highway 11 (FHW3).

Reference numerals 16, 17 denote counters operating according to a clock of the timing circuit 3, and an output of the count value is inputted to an address of a tone ROM 18.

A reference numeral 18 denotes a tone ROM for inputting count values from the counters 16, 17 as an address, and outputting tone PCM data and others sequentially to the data line according to the count values.

A reference numeral 19 denotes a parallel-serial converter (74HC166, for example) for subjecting parallel PCM data and others outputted to the data line of the tone ROM 18 to a parallel-serial conversion, and outputting to the forward PCM highway 10 (FHW2) serially.

Here, the description refers to the case where the forward PCM highway and the backward PCM highway operate at 2,048 MHz. The one PCM highway is divided into 32 time slots, each of which has an 8-bit PCM data and others placed thereon.

The tone ROM 18 and its periphery will be described first.

Figure 3:
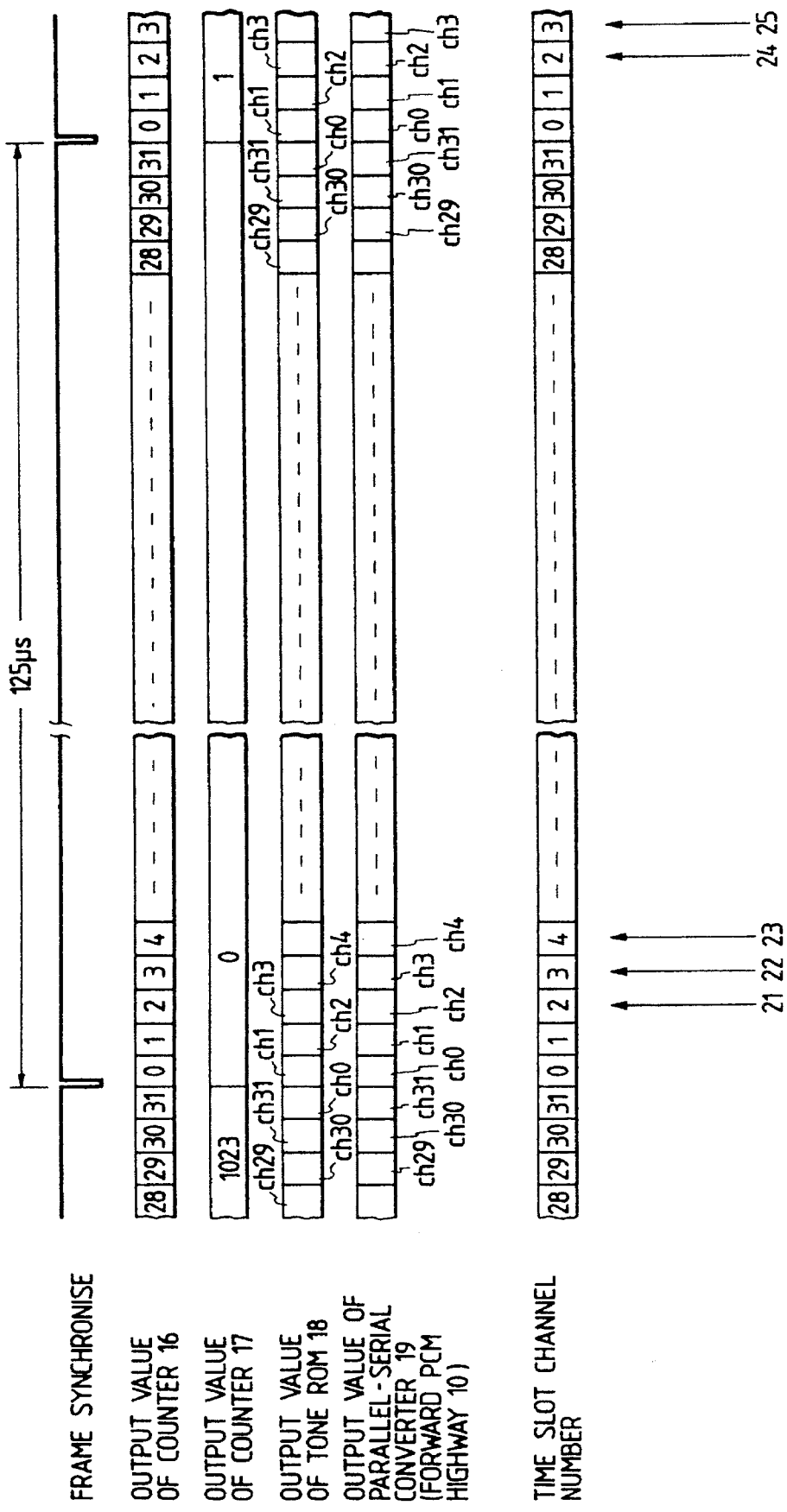
FIG. 3 is a timing chart showing an operation peripheral of ROM 18 of the exchange of FIG. 2.

The counters 16, 17 output values shown in the timing chart of FIG. 3.

That is, the counter 16 is reset according to a frame synchronizing signal for placing the time slots of PCM highway in position, synchronized then with 256 kHz which is a period of the time slots, and thus is counted up. When counted up to 31, it is reset according to the frame synchronizing signal as shown in the timing chart, therefore the 256 kHz counting cycle from 0 to 31 is repeated at 8 kHz.

The counter 17 is counted up at every frame synchronizing signal, therefore counting is repeated at 8 kHz, and the output value repeats 0 to 1023.

Figure 4:
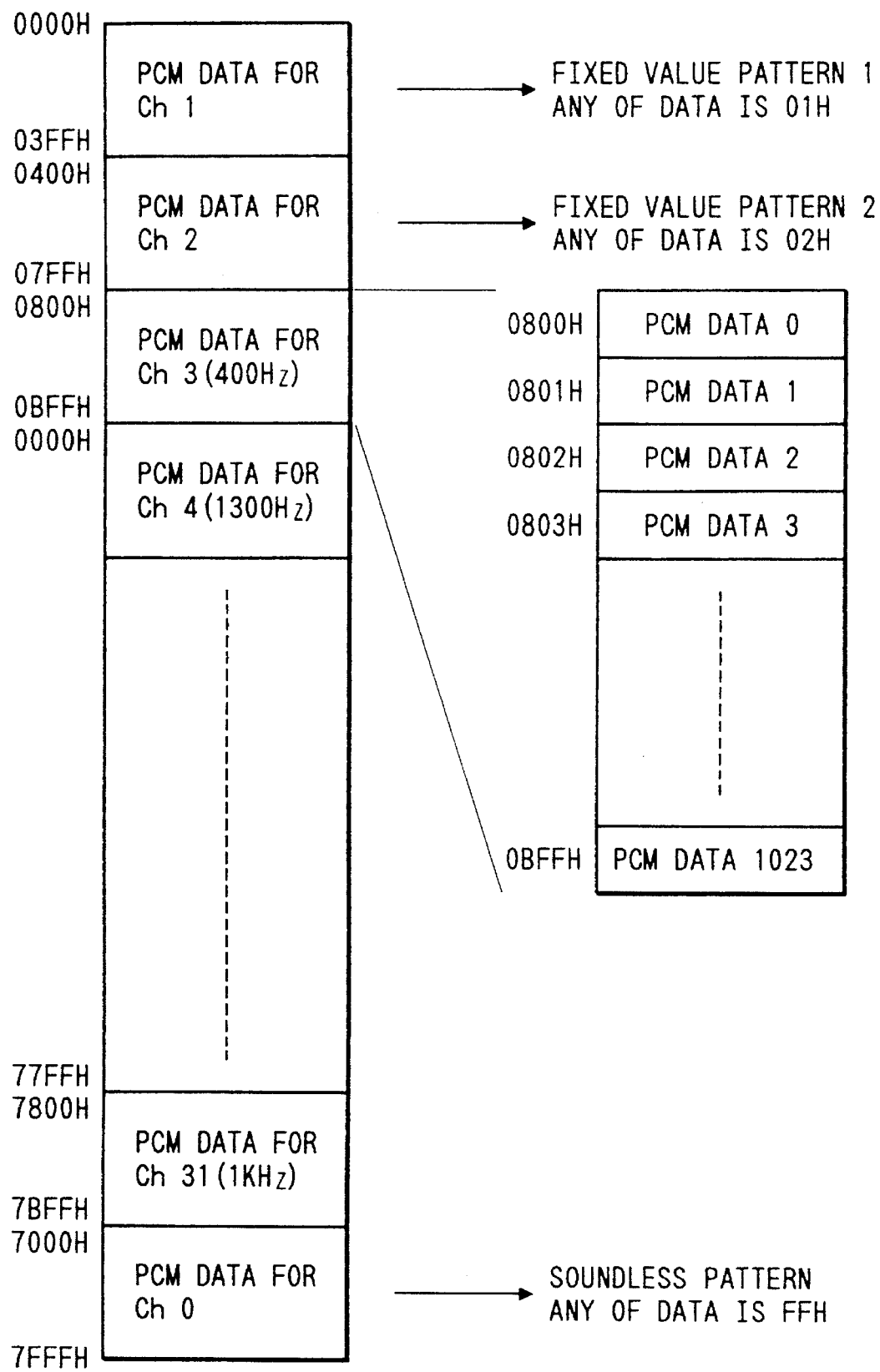
FIG. 4 is an explanatory drawing showing data stored in the ROM 18 of FIG. 2.

As shown in FIG. 4, PCM data such as tones of 32 kinds maximumly and others are written in the tone ROM 18.

For example, PCM data for the 400 Hz tone is written in a region (0800H to 0BFFH) of PCM data for Ch 3. From reading the PCM data byte by byte from 0800H at 8 KHz, or at every 125 μs and converting into analog, a 400 Hz tone signal will be obtained.

Similarly, as for PCM data for Ch 4 to PCM data for Ch 31, from reading PCM data byte by byte at 8 KHz according to the order of address to conversion, a corresponding tone signal is obtainable. However, a soundless PCM data, namely FFH in PCM according to a system such as A-law, μ-law or the like is written in a region of PCM data for Ch 0.

Then, 01H only is written in a region of PCM data for Ch 1, and 02H value only is written in a region of PCM data for Ch 2.

As shown in FIG. 2, an output of count values from the counters 16, 17 is inputted to an address of the tone ROM 18, therefore PCM data shown in FIG. 3 is outputted from the tone ROM 18.

That is, in a time slot timing indicated by a numeral 21 in FIG. 3, for example, an output value of the counter 16 is 2 and an output value of the counter 17 is 0. Accordingly, an address value inputted to the one ROM 18 is 0800H, and PCM data 0 for Ch 3 is outputted from the tone ROM 18 as will be understood from FIG. 4.

The PCM data is converted into a serial data by the parallel-serial converter 19 in the timing of a time slot 22, and is sent to Ch 3 of the time slot of the forward PCM highway 10 (FHW2).

Then, since an output of the counter 16 is counted to 3 in the timing 22, PCM data for Ch 4 is outputted from the tone ROM 18. The data is then converted into a serial data in the next timing 23, and is sent to Ch 4 of the time slot of the forward PCM highway 10 (FHW2). The aforementioned operation is repeated thenceforward.

In a timing 24 after passing 125 μs from the timing 21, an output value of the counter 16 is counted up to 2, and an output value of the counter 17 is counted up to 1. Accordingly, an output value from the tone ROM 18 becomes PCM data 1 (value of address 0801H) of PCM data for Ch 3, which is sent to the forward PCM highway 10 (FHW2) from the parallel-serial converter 19 in the next timing 25.

Such operation is repeated, and various sounds in the tone ROM 18 are sent to each channel of the forward PCM highway.

Meanwhile, PCM data for Ch 0, PCM data for Ch 1 and PCM data for Ch 2 shown in FIG. 4 are fixed values of soundless pattern FFH, and 01H, 02H respectively. Accordingly, the fixed PCM data values of FFH, 01H and 02H remain at all times in the channels 0, 1, 2 of the forward PCM highway 10.

Figure 5:
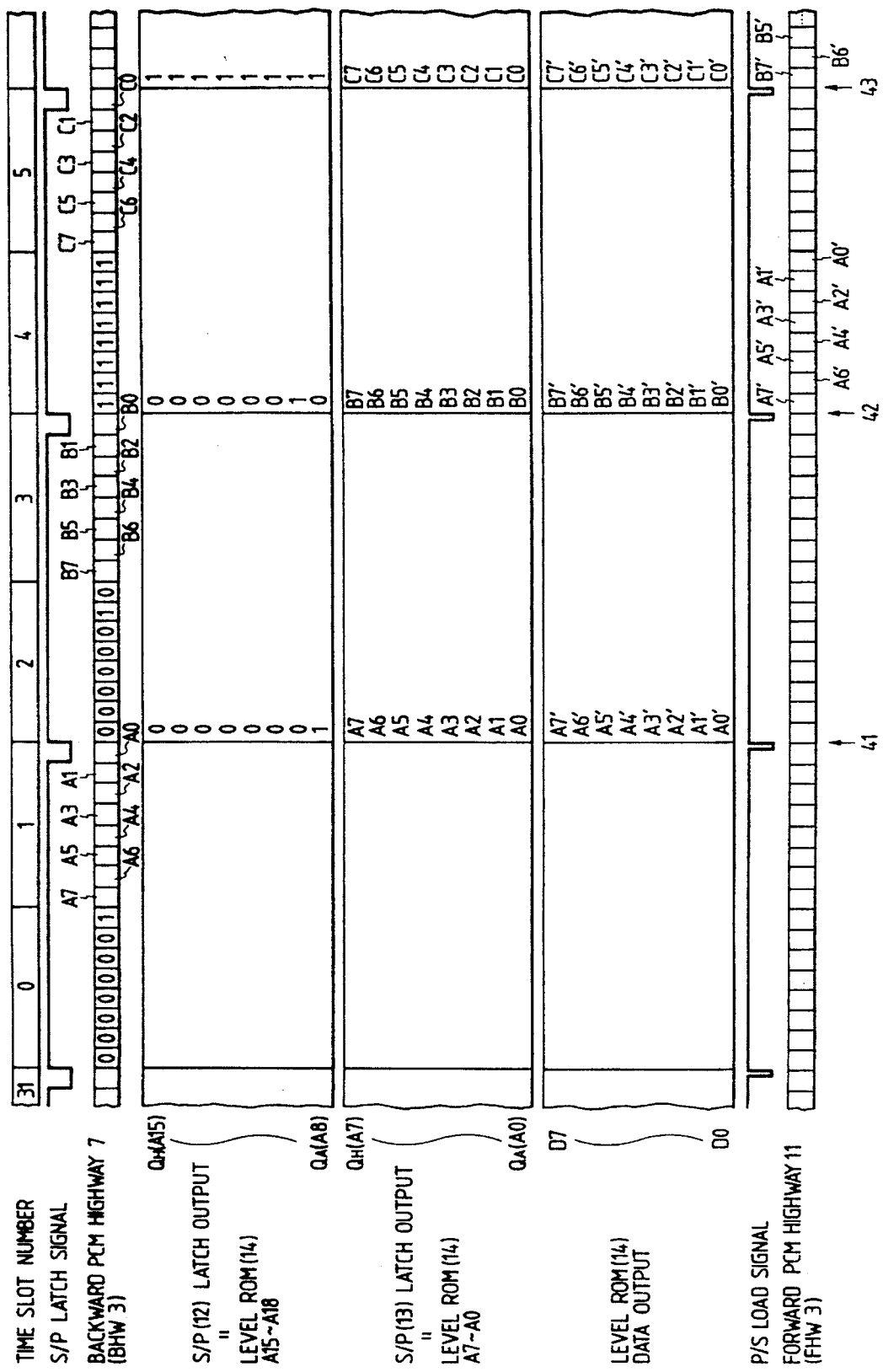
FIG. 5 is a timing chart showing an operation peripheral of ROM 14 of the exchange of FIG. 2.

Next, the description will refer to the level ROM 14 and its periphery. An operation timing of the level ROM 14 and its periphery is shown in FIG. 5.

Referring now to the timing chart, PCM data of the backward PCM highway (BHW3) is converted into a parallel data by the serial-parallel converters 12, 13 for two time slots, that is, in 16 bits.

That is, for example, as S/P latch signal rises on 41 timings (FIG. 5), and data shifted serially in the parallel-serial converters 12, 13 is latched on a parallel output. The latch signal is generated on every other boundary line of the time slots, therefore data for two slots will be converted concurrently into parallel data.

An output of the output latch of these two serial-parallel converters 12, 13 is connected to an address input of the level ROM 14, and the level ROM 14 outputs data according to the address input. The output data is inputted to a shift register in the parallel-serial converter 15 in a timing indicated, for example, by 42 in FIG. 5, that is, on a load signal which becomes active on every other boundary line of the time slots. It is then shifted serially in the timing of PCM highway, and outputted to the forward PCM highway 11 (FHW3).

Such operation is repeated at every time slots, and as indicated by reference numerals 41, 42, 43 in FIG. 5, the latch signal of the serial-parallel converters 12, 13 and the load signal of the parallel-serial converter 15 are inputted to each converter in the timing every other boundary line of the time slots.

The content of the level ROM is a PCM value as a result of amplifying or attenuating a PCM value level (value converted into a linear value) of input ports A0 to A7 by a multiplying factor according to values of input ports A8 to A15.

For example, in case the level of PCM values of A7 to A0 is doubled when A15 to A8 stand at 00000010 (02H), the content of ROM 14 will be set as shown below.

FIG. 6 is a coordinate table of PCM data values and level values. For example, when A7 to A0 are 11111010 (FAH), a level value of A7 to A0 PCM data is 10 from FIG. 6.

Now, therefore, the PCM pattern corresponding to a level value 20 coming double thereof is 11110101 (F5H) from FIG. 6, therefore data of the address 02FAH is set as F5H.

Similarly, another example wherein a level of the PCM value of A7 to A0 is made half at the time when A15 to A8 are 11111111 (FFH) will be taken up for description. If, for example, A15 to A0 are 1111111111110111 (FFF7H), then a level value of the PCM pattern of A7 to A0 is 16. Accordingly, data coordinate with the address is set as 11111011 (FBH) of the level value 8.

If the content of the level ROM 14 is set such, a voice having a time slot number of the backward PCM highway 7 (BHW3) assigned to an odd time slot is amplified or attenuated by a level converting data (02H, FFH in the aforementioned example) of one prior time slot, coming at a position 3 time slots behind the forward PCM highway 11 (FHW3).

In this case, the level converting data placed on the even time slot of the backward PCM highway 7 (BHW3) utilizes a fixed data pattern of FFH, 01H, 02H placed on the time slot channels 0, 1, 2 of the forward PCM highway 10 (FHW2) from the tone ROM. Then, from exchanging these fixed data patterns on the time switch 2, the level converting data is placed on the backward PCM highway 6 (BHW2).

As described above, a voice from the forward PCM highway 8 (BHW0) is assigned, for example, to the backward PCM highway 7 (BHW3), and its level is changed at every time slot. Further, the voice of the forward PCM highway 11 (FHW3) having its level changed as above is assigned to the backward PCM highway 4 (BHW0), thereby effecting a gain control.

The following advantages will be realized from the above-described construction.

That is, since a circuit to control is minimized against the number of circuits, the hardware can be simplified. For example, in the case of 2,048 MHz PCM highway, 16 station lines can be controlled by one circuit.

Further, since the circuit operating for gain control at every station line is not provided, a circuit for station lines can be simplified.

Accordingly, the hardware can be simplified to enhance a reliability of the equipment.

Further, since the PCM data is amplified or attenuated as a digital data, a tonal quality is almost not deteriorated.

Then, various tone signal generating ROM's can be identified from using ROM for generating and sending fixed data, which may lead to a cost reduction.

Further, a generation of many fixed data may be realized simply and inexpensively by using a counter for generating and sending fixed data.

Further, from using a PCM soundless pattern (FFH) as fixed data, the time slot is not necessarily assigned for fixed data, and thus the time slot can be applied efficiently.

Then, not only a sound from the circuit but also a sound of internal source for sound message service, for example, can be amplified and attenuated.

Then, a "sound" signal is exemplified for the convenience sake as above, however, this invention is not necessarily so limited, needless to say, by transmission signal band, signal modulation system and others.

Figure 7:
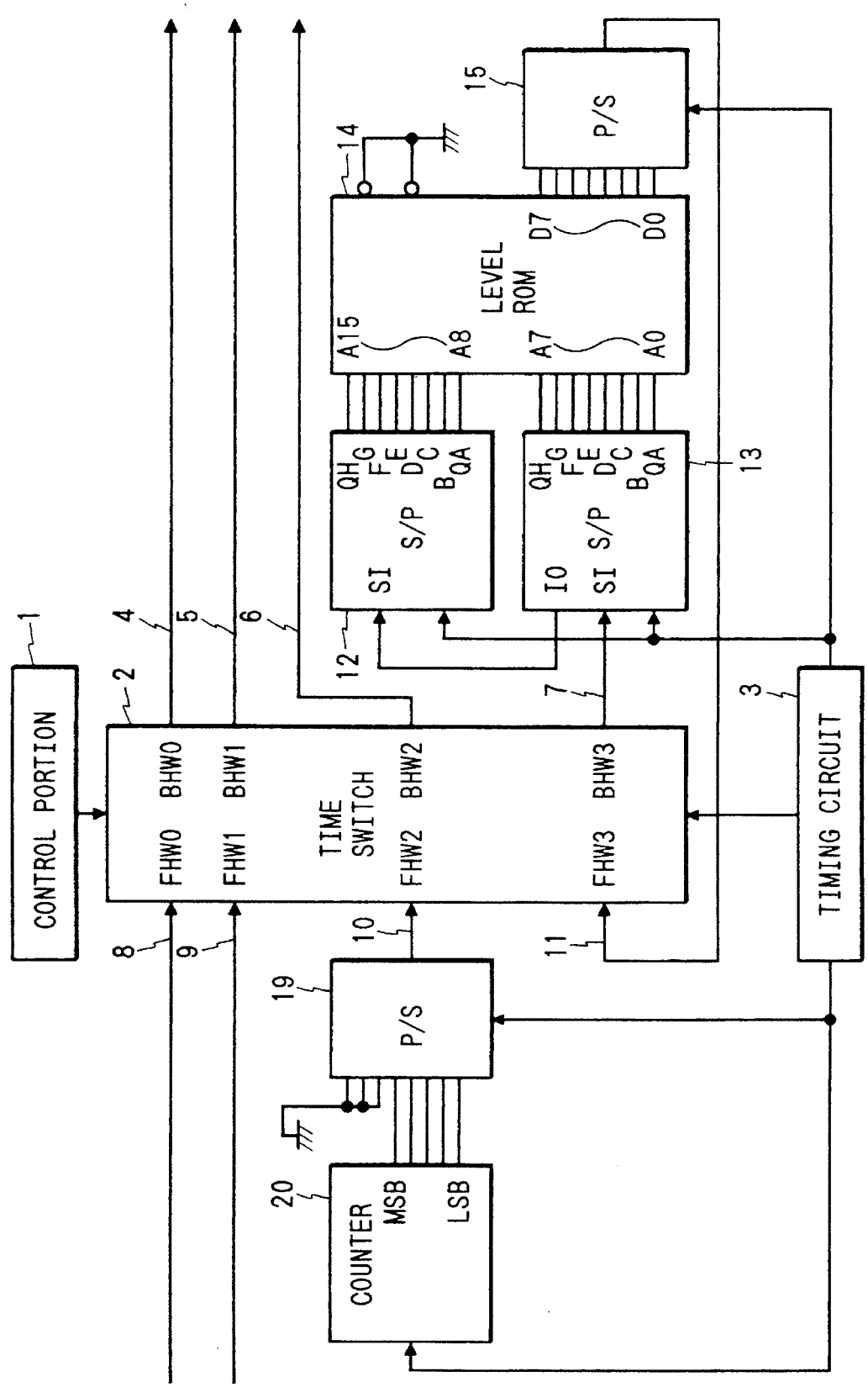
FIG. 7 is a block diagram of an exchange main part given in another embodiment.

While the counters 16, 17 and the ROM 18 and the parallel-serial converter 19 are used for sending fixed data to the time slot in FIG. 2, the counter 20 and the parallel-serial converter 19 may be employed as shown in FIG. 7.

Reference numerals 1 to 15, and 19 represent like parts denoted by 1 to 15, and 19 in FIG. 2. A counter 20 is for counting up (or counting down) at 256 KHz synchronously with a clock from the timing circuit 3, and an output of the count value is connected to an input of the parallel-serial converter 19.

Figure 8:
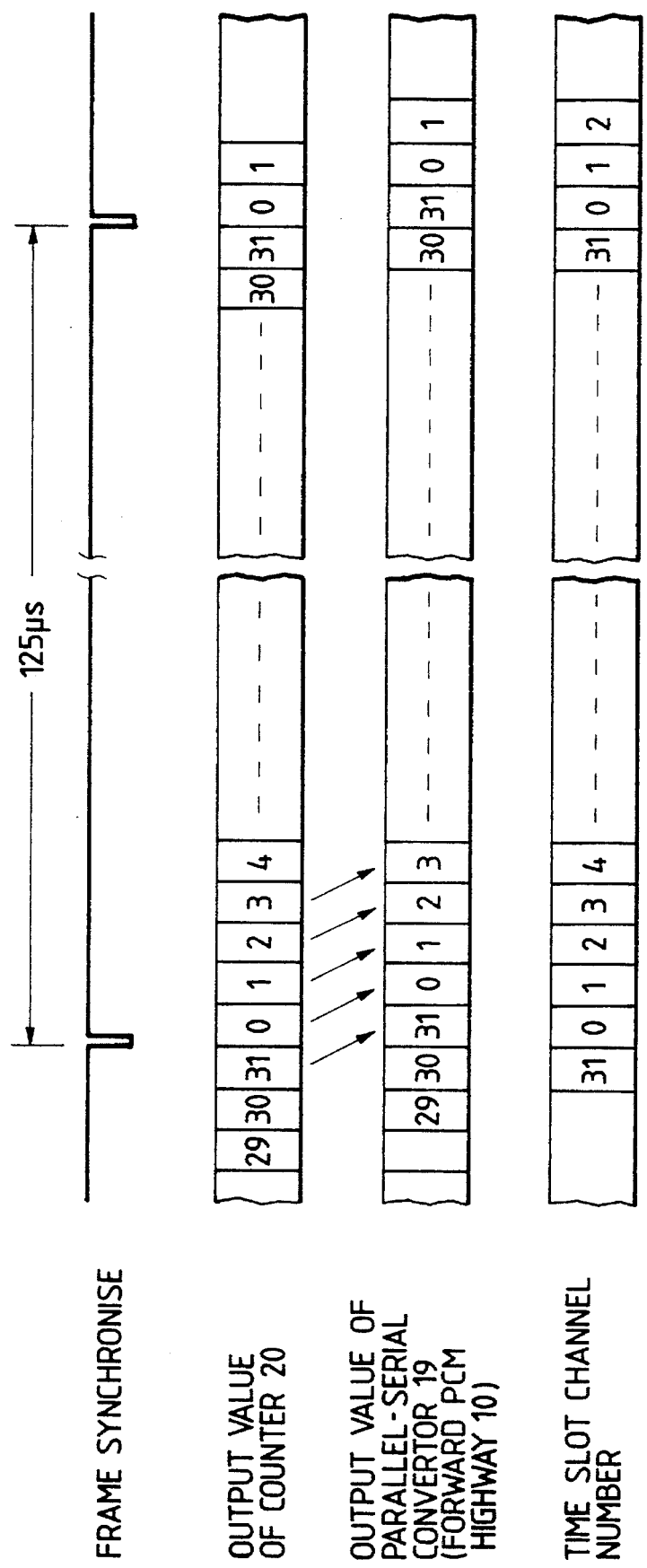
FIG. 8 is a timing chart showing an operation of the exchange of FIG. 7.

As shown in a timing chart of FIG. 8, the output of the counter 20 changes the count value at 256 KHz synchronously with a frame synchronization. That is, it outputs 0 when the time slot channel number is 0, and 1 when the channel number is 1 as counting up sequentially.

The count value is converted into a serial data by the parallel-serial converter 19, and sent to the forward PCM highway in a timing of the next time slot. That is, fixed data is placed on each time slot of the forward PCM highway as a data 31 is placed on the time slot of channel number 0, 0 is placed on the channel number 1 and 1 is placed on the channel number and so on. The subsequent operation is same as the embodiment 1.

Then, the PCM highway may run at a speed other than 2.048 MHz.

The above-described embodiment has referred to a construction wherein the serial-parallel converters and 13 are cascaded, and a data stored in the ROM is accessed with the data of two continuous time slots as an address, however, two backward highways will be used for the fixed data portion and the sound data portion, and the time slots will be used in parallel each at the fixed data portion and the sound data portion, otherwise.

Figure 9:
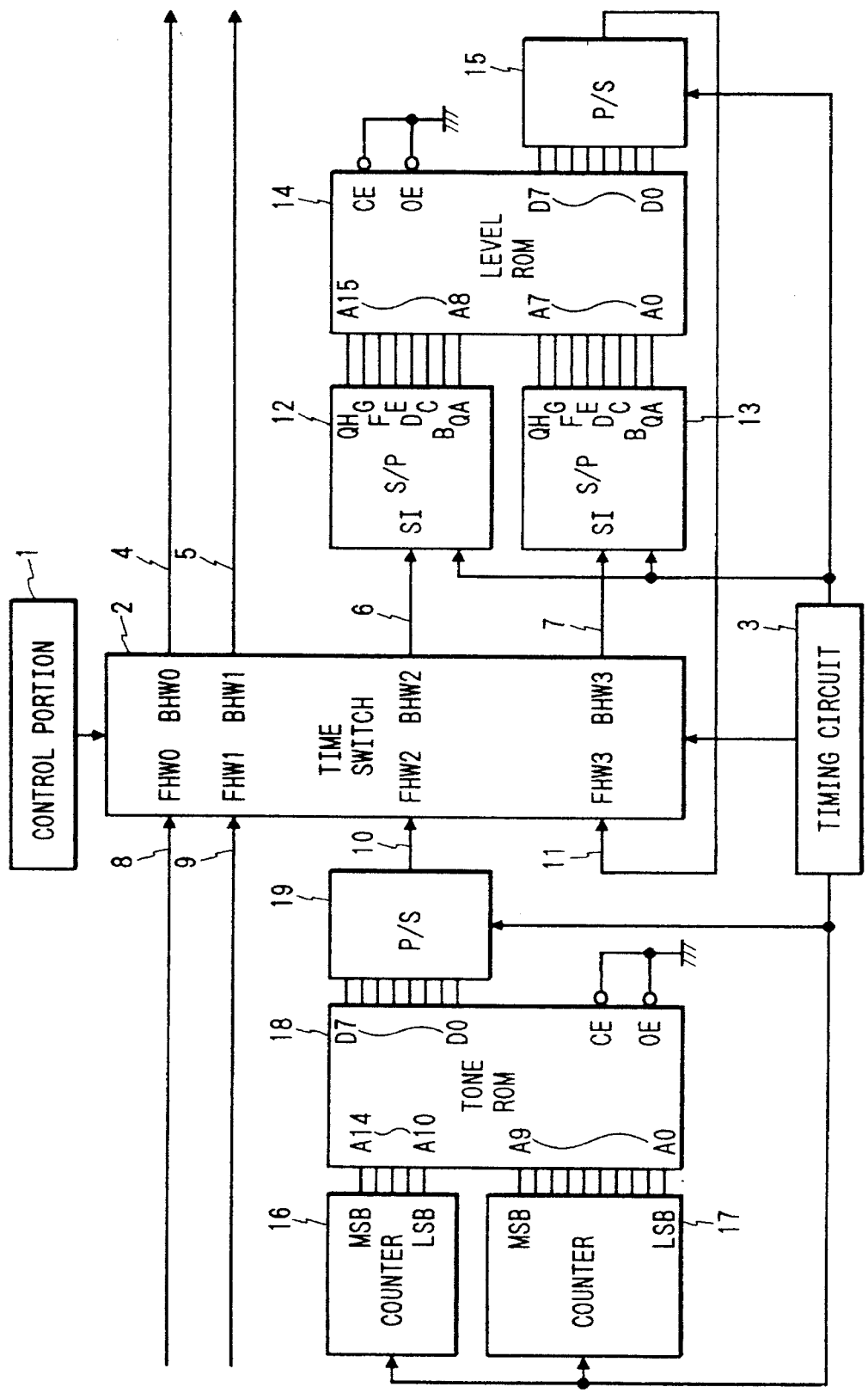
FIG. 9 is a block diagram of another exchange.

The construction given in FIG. 9 is such that data of the backward highway (BHW2) is inputted to the serial-parallel converter 12, and data of the backward highway (BHW3) is inputted in parallel to the serial-parallel converter 13. Other constructions of FIG. 9 are similar to that of FIG. 2.

Figure 10:
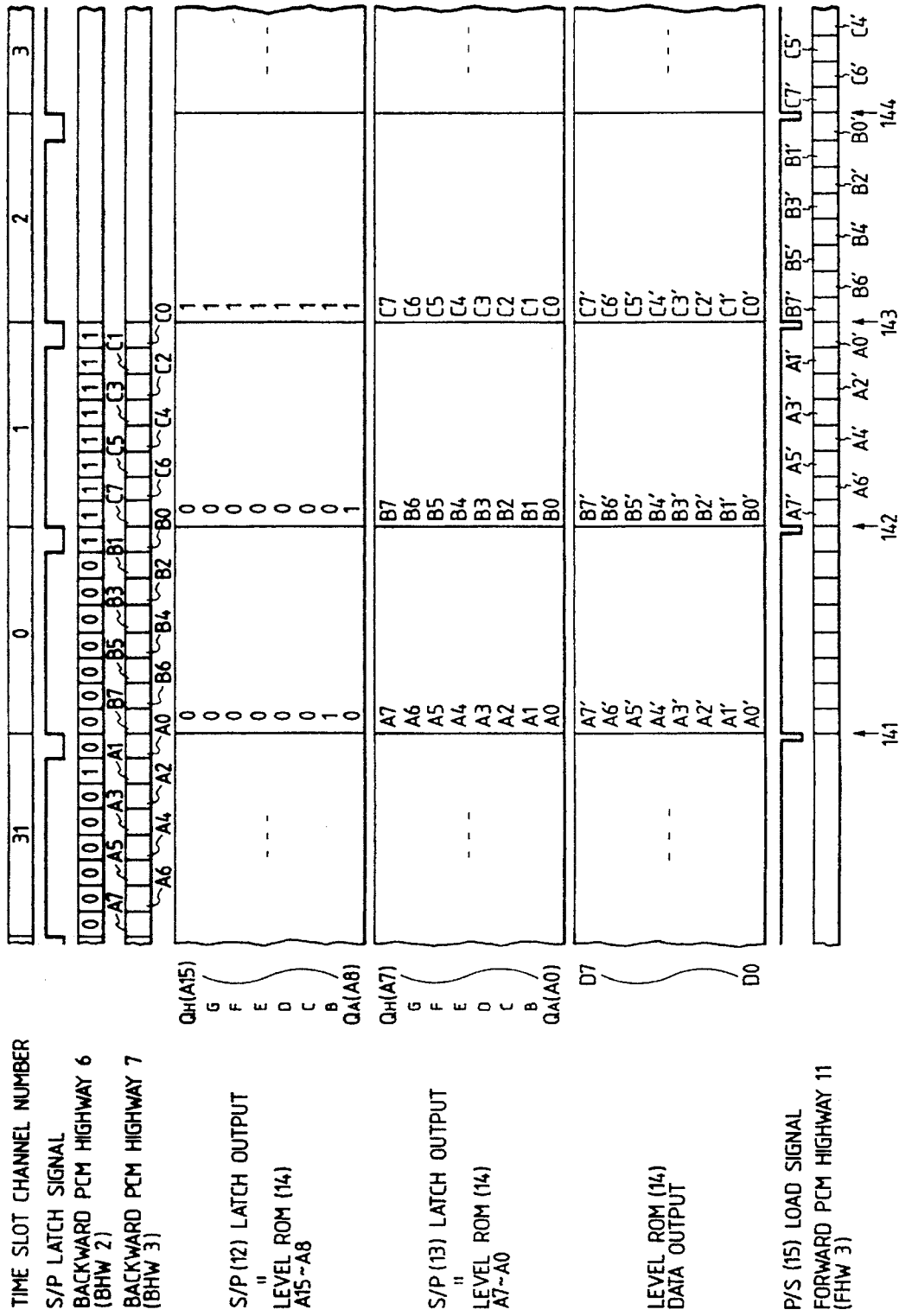
FIG. 10 is a timing chart showing an operation of the exchange of FIG. 9.

An operation timing of the level ROM 14 and its periphery of FIG. 9 is shown in FIG. 10. Then, the fixed data is supplied by the tone ROM 18 as shown in FIG. 3 similarly to the construction of FIG. 2.

PCM data of the backward PCM highway 6 (BHW2) is converted into a parallel data in bytes (8 bits) by the serial-parallel converter 12.

That is, an S/P latch signal rises, for example, in a timing indicated by 141 in FIG. 10, and a data shifted serially in the parallel-serial converter 12 is latched on a parallel output. The latch signal is generated at a boundary line of the time slots, providing data for one time slot.

Similarly thereto, the parallel-serial converter 13 converts PCM data of the backward PCM highway 7 (BHW3) into a parallel data at every time slots.

An output of the output latch of the two serial-parallel converters 12, 13 is connected to an address input of the level ROM 14, the level ROM 14 outputs data according to the address input, the data is inputted to the parallel-serial converter 15 as a parallel data and loaded in a shift register of the parallel-serial converter 15 from the parallel input in a timing indicated, for example, by 42 of FIG. 10, that is, according to the load signal which becomes active at a boundary line of the time slots. It is then shifted serially in a timing of the PCM highway, and outputted as a data of the forward PCM highway 11 (FHW3).

Such operation is repeated at every time slot, and the latch signal of the serial-parallel converters 12, 13 and the load signal of the parallel-serial converter 15 are inputted to each converter in the timings of boundary lines of the time slots as indicated by 141, 142, 143 in FIG. 10.

The content of the level ROM 14 is a PCM value obtained as a result of multiplying a level of PCM values of A0 to A7 (value converted into a linear value) at a predetermined rate according to values of A8 to A15.

In case, for example, a level of PCM values of A7 to A0 is made double when A15 to A8 are 00000010 (02H), the ROM content will be set as follows:

FIG. 6 is a coordinate table of a value of PCM data and a level value. Then, when A7 to A0 are 11111010, for example, a level value of PCM values of A7 to A0 is 10 from FIG. 6.

Now, since the PCM pattern corresponding to a level value 20 which is double of the value is 11110101 (F5H) from FIG. 6, data of the address 02FAH is set as F5H.

Similarly as one more example, the case where the level of PCM values of A7 to A0 is made half at the time when A15 to A8 are 11111111 (FFH) will be described. For example, if A15 to A0 are 1111111111110111 (FFF7H), then a level value of PCM patterns of A7 to A0 is 16. Accordingly, a data corresponding to the address will be set as 11111011 (FBH) of the level value 8.

From setting the content of the level ROM 14 such, a sound assigned to the backward PCM highway (BHW3) is amplified or attenuated (level shift) by level converting data (02H, FFH in the foregoing example) of the same time slot as the backward PCM highway 6 (BHW2), and the sound is placed on the forward PCM highway 11 (FHW3) at a position coming one time s lot behind.

In this case, the level converting data placed on a time slot of the backward PCM highway 6 (BHW2) utilizes FFH, 01H, 02H fixed data patterns placed on the time slot channels 0, 1, 2 of the forward PCM highway 10 (FHW2) from the tone ROM 18. The level converting data is placed on the backward PCM highway 6 (BHW2) by exchanging these fixed data patterns on the time switch 2.

Thus, in the construction of FIG. 9, a sound from the forward PCM highway 8 (FHW0), for example, is assigned to the backward PCM highway 3, and the sound is changed in level at every time slots. Further, from assigning the level-changed sound on the forward PCM highway 11 (FHW3) to the backward PCM highway 4 (BHW0), a gain control can be realized.

It goes without saying that an alternative similar to the embodiment of FIG. 2 will be obtainable also in the embodiment of FIG. 9.

Figure 11:
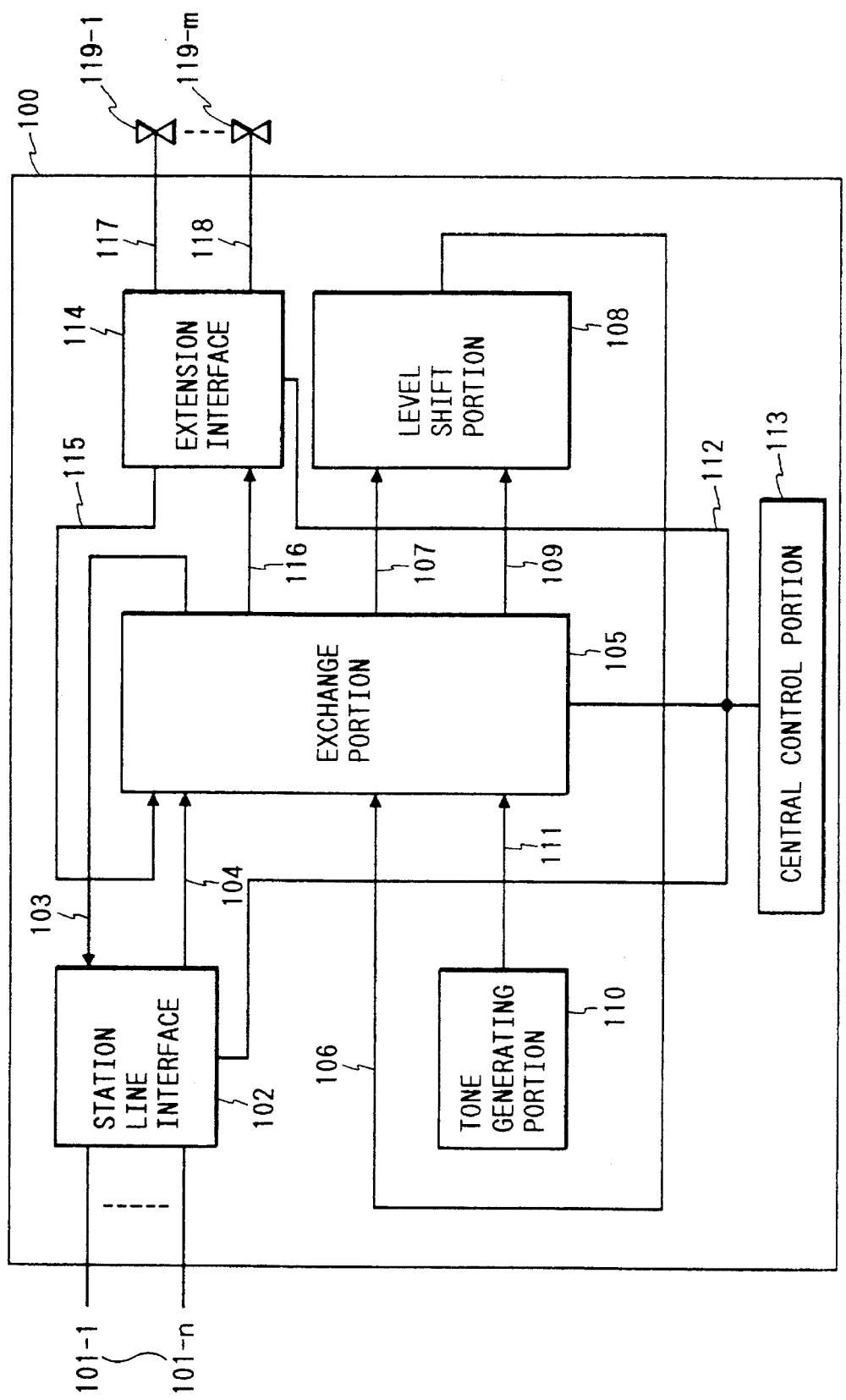
FIG. 11 is a block diagram of a main equipment of a further embodiment.

FIG. 11 is a block diagram representing a configuration of a main equipment 100 given in another embodiment of the invention. This embodiment is constructed such that a code for specifying an arbitrary gain or loss level and a PCM code of communication portion of an arbitrary time slot are inputted concurrently to a level shift portion 108, thereby realizing an arbitrary level conversion at every time slots. In FIG. 11, a reference numeral 100 represents a main equipment of a telephone exchange of this embodiment, a station line interface 102 encloses station lines 101-1 to 101-n, and is connected to an exchange portion 105 through a forward PCM highway 104 and a backward PCM highway 103. The main equipment 100 employs a time sharing exchange system, and the channel is 64 Kbps (8 KHz sampling×8 bits) and constructed of a PCM data string of 32 time slots per highway. A tone generating portion 110 for generating various service tones as telephone exchange such as, for example, dial tones to be sent to extension telephone sets 119-1 to 119-m at the time of private dialing and the like is connected to the exchange portion 105 through a forward highway 111, and the level shift portion 108 is connected thereto through backward highways 107 and 109 and a forward highway 106.

Then, an extension interface 114 capable of enclosing the extension telephone sets 119-1 to 119-m is connected to the exchange portion 105 through a forward highway 115 and a backward highway 116.

Further, a central control portion 113 operating for control of the main equipment is connected to the exchange portion 105 and the station line interface 102 through a control line 112.

Next, each main block of the station line interface 102, the tone generating portion 110 and the level shift portion 108 will be described in detail.

Figure 12:
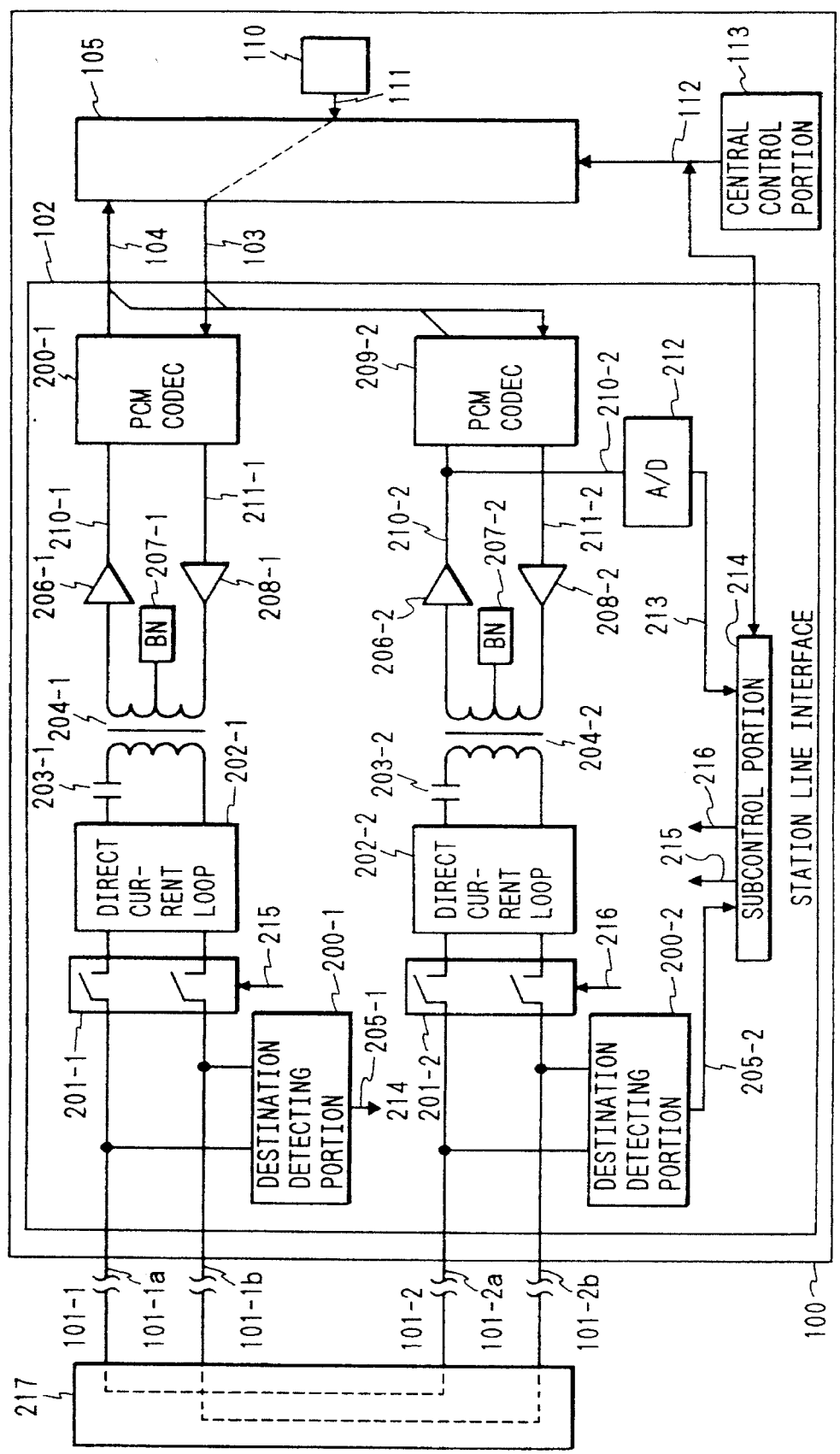
FIG. 12 is a block diagram of a station line interface of the embodiment of FIG. 11.

FIG. 12 represents the station line interface 102 of this embodiment, which encloses the station lines 101-1, 2. Lines 101-1a, 101-1b of the station line 101-1 and lines 101-2a, 101-2b of the station line 101-2 are enclosed in a station exchange 217, and the station line 101-1 is connected to a destination (data reception) detecting portion 200-1 and a break contact of a relay 201-1. The relay 201-1 is controlled by a subcontrol portion 214 through a signal line 215. A make contact of the relay 201-1 is connected to a direct current loop circuit 202-1, and is further connected to a direct current cut capacitor 203-1 and a primary side of a hybrid transformer 204-1 through the direct current loop circuit 201-1. A Secondary side of the hybrid transformer 204-1 is connected to a receiving amplifier 206-1 and a sending amplifier 208-1 and a balancing circuit 207-1 for impedance matching with a station line side.

An output of the receiving amplifier 206-1 is connected to a PCM codec 209-1 through a signal line 210-1, and an input of the sending amplifier 208-1 is connected to the PCM codec 209-1 through a signal line 211-1.

The station line 101-2 is connected as in the case of the station line 101-1, therefore a further description will be omitted here, however, an output 210-2 of a receiving amplifier 206-2 is connected to a PCM codec 209-2 and an A/D converter 212.

The destination (data reception) detecting portions 200-1, 200-2, the relays 201-1, 201-2 and the A/D converter 212 are connected each to the subcontrol portion 214 operating for control of the station line interface 102 and communication with the central control portion 113 of the main equipment 100. The PCM codecs 209-1, 209-2 are connected to the exchange portion 105 through the forward PCM highway 104 and the backward PCM highway 103.

The tone generating portion 110 is connected to the exchange portion 105 through the forward PCM highway 111, and the central control portion 113 is connected thereto through the control line 112.

In this embodiment, the station line interface 102 measures a loss on the lines 101-1a, 1b and 101-2a, 2b as far as the station exchange 217 and informs the central control portion 113 of the main equipment 100 of a result obtained therefrom. The operation will be described below.

After the telephone exchange is installed and a power source of the equipment is raised, the central control portion 113 originates a call from the station line 101-1 to the station line 101-2. That is, when the subcontrol portion 214 having received an instruction from the central control portion 113 drives the relay 201-1 through the signal line 215, an originating operation is carried out to the station exchange 217.

Subsequently, the subcontrol portion 214 operates for dial-up from operating the relay 201-1 according to a designation of the central control portion 113. The dial number in this case is that of another station line 101-2 enclosed in the station line interface 102 of the main equipment.

Upon receipt of the dial number from the station line 101-1, the station exchange 217 sends a destination signal to the station line 101-2. When a destination detecting portion 200-2 detects the destination signal from the station exchange 217, the subcontrol portion 214 drives a relay 201-2 through a signal line 216, thus an answering operation is carried out. Channels of the station line 101-1 and the station line 101-2 are hence formed through the station exchange 217.

The central control portion 113 then controls the exchange portion 105 through the control line 112, and connects the tone generating portion 110 to the forward highway 111 and the backward highway 103. Various tones necessary for the main equipment are loaded in the tone generating portion 110 as described hereinbefore, and a reference sound source, for example, 1.5 KHz, level $L_1 = -15$ dBm, which is necessary for measurement of a line loss is sent to the forward highway 111. A reference signal 1.5 KHz, −15 dBm is inputted to the PCM codec 209-1 through the backward highway 103, arriving at the sending amplifier 208-1 through the signal line 211-1. Further, the reference signal is sent to the station line 101-1 from the sending amplifier 208-1 through the hybrid transformer 204-1.

The reference signal is returned at the station exchange 217 and sent to the station line 101-2. The reference signal passes a hybrid transformer 204-2 through the station line 101-2, and is inputted to the receiving amplifier 206-2. Further, the reference signal is inputted to the PCM codec 209-2 and the A/D converter 212 through the output line 210-2. The A/D converter 212 subjects the inputted reference signal to analog/digital conversion, and sends a resultant output level $L_2$ to the subcontrol portion 214. The subcontrol portion 214 having received the output level $L_2$ obtains a line loss $L_l$ through the following equation:

$$L_l = (|L_2| - L_1|)/2$$

Now, if $L_2 = -27$ dBm is inputted to the subcontrol portion, then $L_l = 6$ dB, and the subcontrol portion 214 informs the central control portion 113 of the line loss $L_l$ through the control line 112.

The central control portion 113 stores the line loss $L_l$ of the station lines 101-1, 2 being 6 dB in the internal memory, and restores the measurement system concurrently therewith.

An origination will be made from the station line 101-2 in this case, and the reference signal may be sent from the station line 101-1.

A line loss on the station lines 101-1, 3 can be measured likewise.

Figure 13:
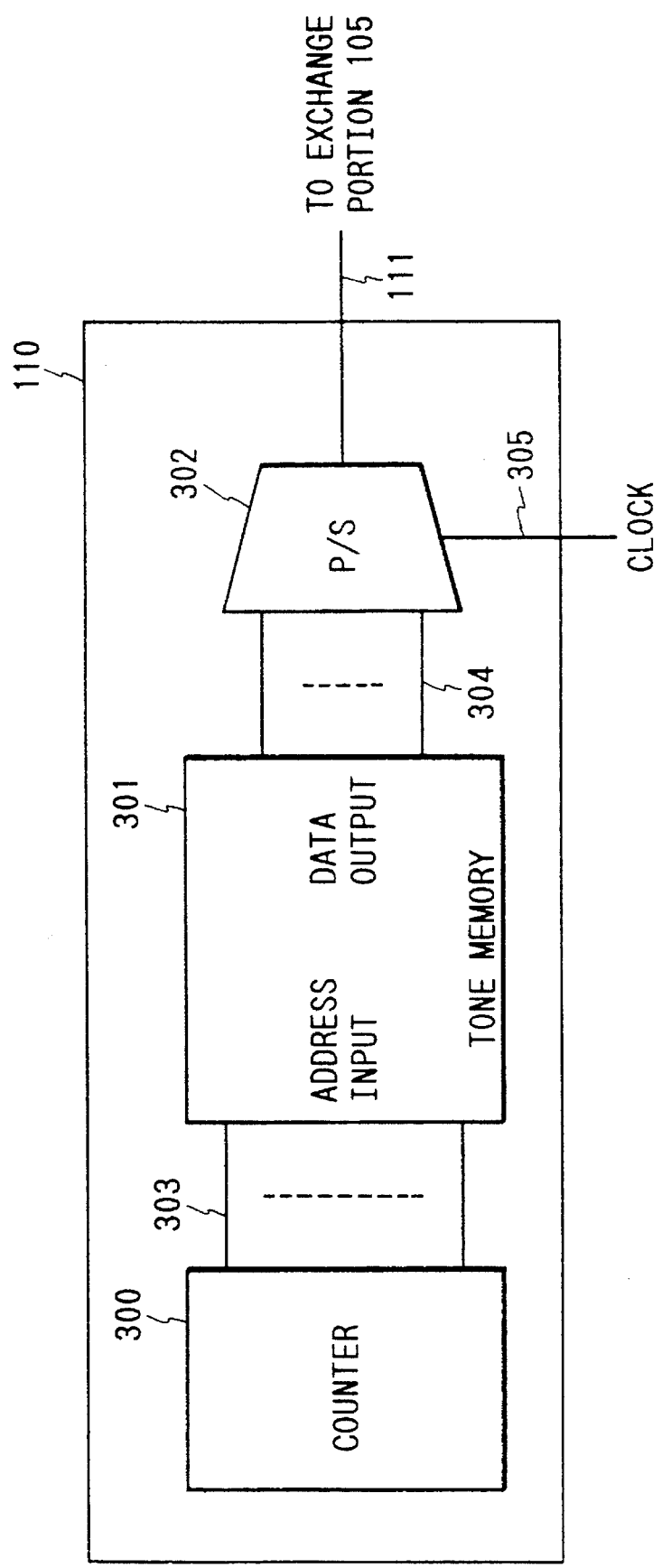
FIG. 13 is a block diagram of a tone generating portion of the embodiment of FIG. 11.

FIG. 13 is a block diagram representing a configuration of the tone generating portion 110 of this embodiment. A counter 300 is connected to an address input of a tone memory 301 through an output signal line 303. A data output of the tone memory 301 is connected to a parallel input of a parallel/serial converter 302 through a signal line 304. A serial output of the parallel/serial converter 302 is connected to the forward PCM highway 111. Further, a clock (2 MHz) is connected to the parallel/serial converter 302 through a signal line 305.

The counter 300 operates for counting at a 100 mS period, and updates an address of the tone memory 301. A tone memory map of this embodiment is shown in FIG. 14, wherein an output of the counter 300 is repeated between 0 to 25631.

When the counter value is 0, that is, address 0, PCM data on the first byte of a tone 1 is outputted to the data output line 304 of the tone memory 301, and sent serially to the forward PCM highway 111 by the parallel/serial converter 302 synchronous with the clock 305. At the time of address 1 continuously, data on the first byte of a tone 2 is outputted parallelly to the data output line 304 of the tone memory 301, and sent serially to the forward PCM highway 111 from the parallel/serial converter 302 synchronously with the clock 305. A bit string on the first byte of 29 kinds of tones is formed on the PCM highway 111 likewise up until address 28.

At address 29 data on the first byte of a +3 dB indicating signal is read from the memory 301, and is sent to the PCM highway 111 as in the case of those up to address 28. Thus, data on the first byte of a +6 dB indicating signal is sent to the PCM highway 111 at address 30, and data on the first byte of a +9 dB indicating signal is sent thereto at address 31.

At addresses 32 to 63 data on the second byte of the tones 1 to 29 and indicating signals are read from the tone memory 301, and sent to the PCM highway 111. Likewise, data coming on the eight-hundredth byte are sent repeatedly to the PCM highway 111.

The 29 kinds of sent tones form a 100 mS signal continuous from the first byte to the eight-hundredth byte. On the other hand, +3 dB indicating signal, +6 dB indicating signal and +9 dB indicating signal are of a data from the first byte to the eight-hundredth byte each, and the identical data is outputted to the PCM highway 111 at every 8 KHz.

Figure 15:
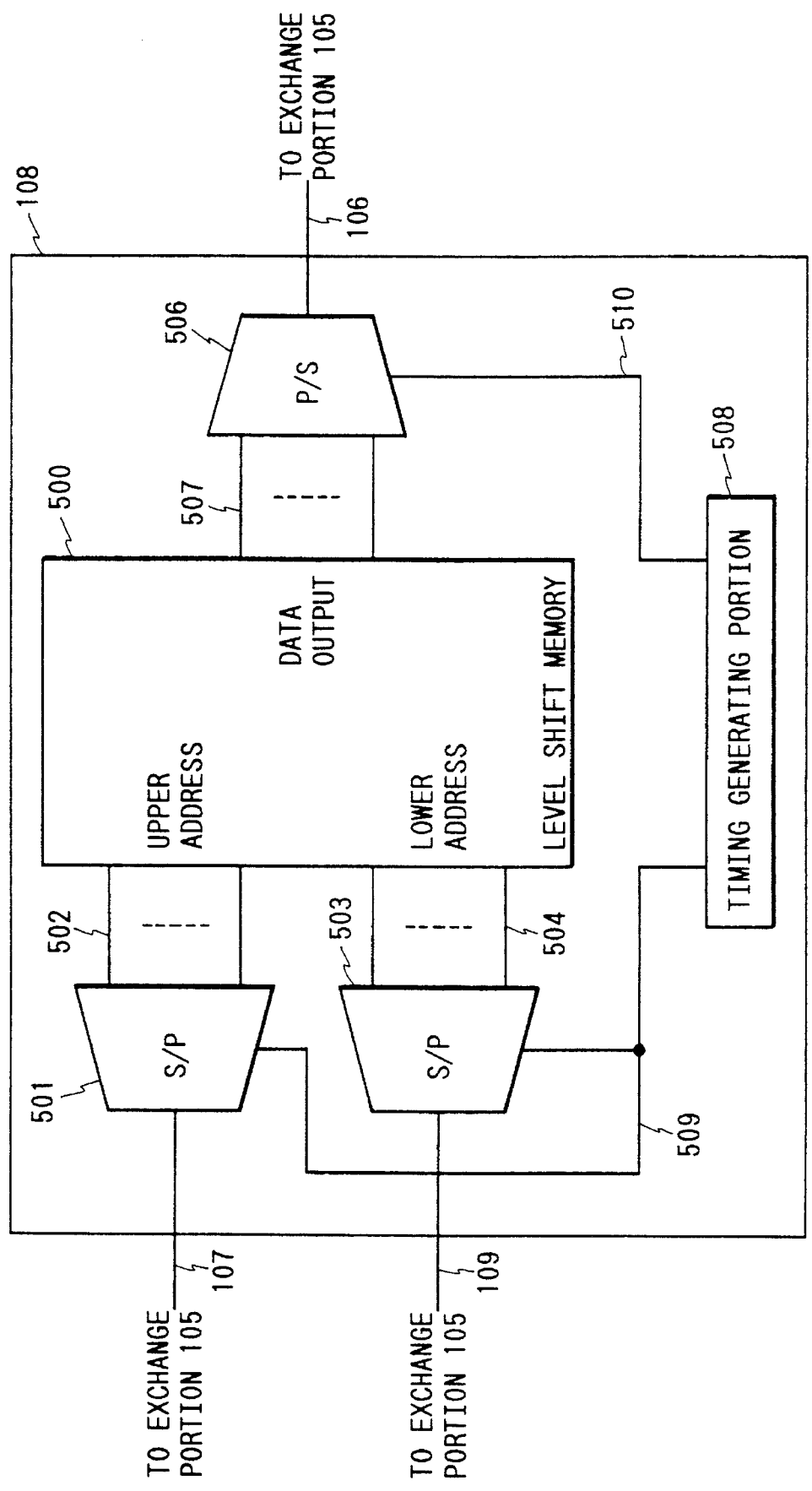
FIG. 15 is a block diagram of a level shift portion of the embodiment of FIG. 11.

FIG. 15 is a block diagram representing a configuration of a level shift portion of this embodiment. A serial/parallel converter 501 is connected to an upper address of a level shift memory 500 through a signal line 502, and the backward PCM highway 107 is connected to a serial input of the serial/parallel converter 501. A serial/parallel converter 503 is connected to a lower address of the level shift memory 500 through a signal line 504, and the backward PCM highway 109 is connected to a serial input of the serial/parallel converter 503. A data output of the level shift memory 500 is connected to a parallel/serial converter 506 through a signal line 507, and a serial output of the parallel/serial converter 506 is connected to the forward PCM highway 106. A timing generating portion 508 generates a timing clock and others for actuating the serial/parallel converters 501, 503 and 506 and feeds them thereto through signal lines 509 and 510.

A PCM data string inputted from the backward PCM highway 107 is synchronized with the timing signal 509 at every 8-bit data to a serial/parallel conversion, and is inputted to the upper address of the level shift memory 500. Similarly further, a PCM data string inputted from the backward PCM highway 109 is synchronized with the timing signal 509 at every 8-bit data to a serial/parallel conversion, and is inputted to the lower address of the level shift memory 500.

Figure 16:
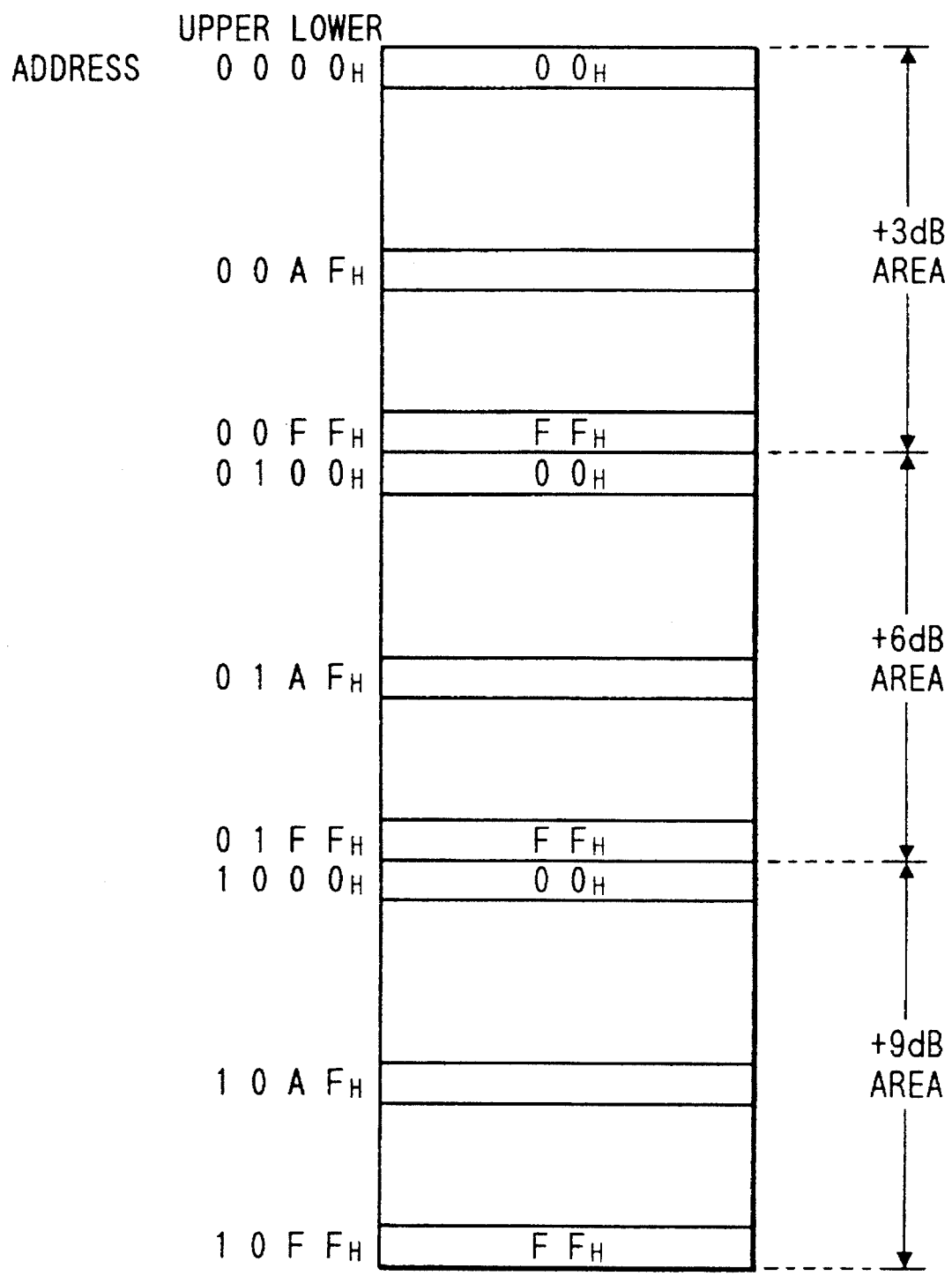
FIG. 16 is a level shift memory map of the embodiment of FIG. 11.

FIG. 16 is a memory map of the level shift memory 500 of this embodiment. Data at addresses 000H to 00FFH are PCM signs having leveled 00H to FFH up by +3 dB respectively, arraying values obtained through $\sqrt{2}$ multiplying those of table 1a/G.711 and table 1b/G.711 according to Rule A of CCITT Recommendation G.711, or table 2a/G.711 and 2b/G.711 according to Rule µ thereof. Data at addresses 0100H to 01FFH are PCM signs having leveled 00H to FFH up by +6 dB respectively, arraying values obtained through doubling the aforementioned CCITT recommended values. Data at addresses 1000H to 10FFH are PCM signs having leveled 00H to FFH up by +9 dB, arraying likewise values obtained through $2\sqrt{2}$ multiplying the CCITT recommended values. However, a maximum value on the positive side is 10H and a minimum value is 00H according to the Recommendation, therefore the PCM sign strings exceeding 10H or coming lower than 00H for calculation are all given at a fixed value of 10H on the positive side and 00H on the negative side.

The aforementioned data on the backward PCM highway is inputted to the upper address of the level shift memory 500, and is used for changing each area of +3 dB, +6 dB or +9 dB. the data on the backward PCM highway is a PCM data inputted to the lower address of the level shift memory 500. For example, to level a PCM sign AFH up by +3 dB, the upper address will be specified to 00H. That is, the data 00H inputted, if so, to the backward PCM highway 107 is subjected to a parallel conversion by the serial/parallel converter 501, and the upper address of the level shift memory becomes 00H. On the other hand, the PCM sign AFH from the backward highway 109 is subjected to a parallel conversion by the serial/parallel converter 503, and the lower address of the level shift memory 500 becomes AFH. Accordingly, a data loaded at address 00AFH on the level shift memory map of FIG. 16 is read out, and is outputted to the data output signal line 507 of the level shift memory 500. Then, it is subjected to a serial conversion by the parallel/serial converter 506 and outputted to the forward PCM highway 106.

Further, from inputting the indicating signal to the backward PCM highway 107 so as to have the upper address at 01H for leveling AFH up by +6 dB and also to have the upper address at 10H for leveling by up +9 dB, PCM signs up by +6 dB and +9 dB will be outputted to the forward PCM highway 106 from the level shift memory 500.

An operation of the level shift will be described below along with the exchange portion on the above description of each block.

Figure 17:
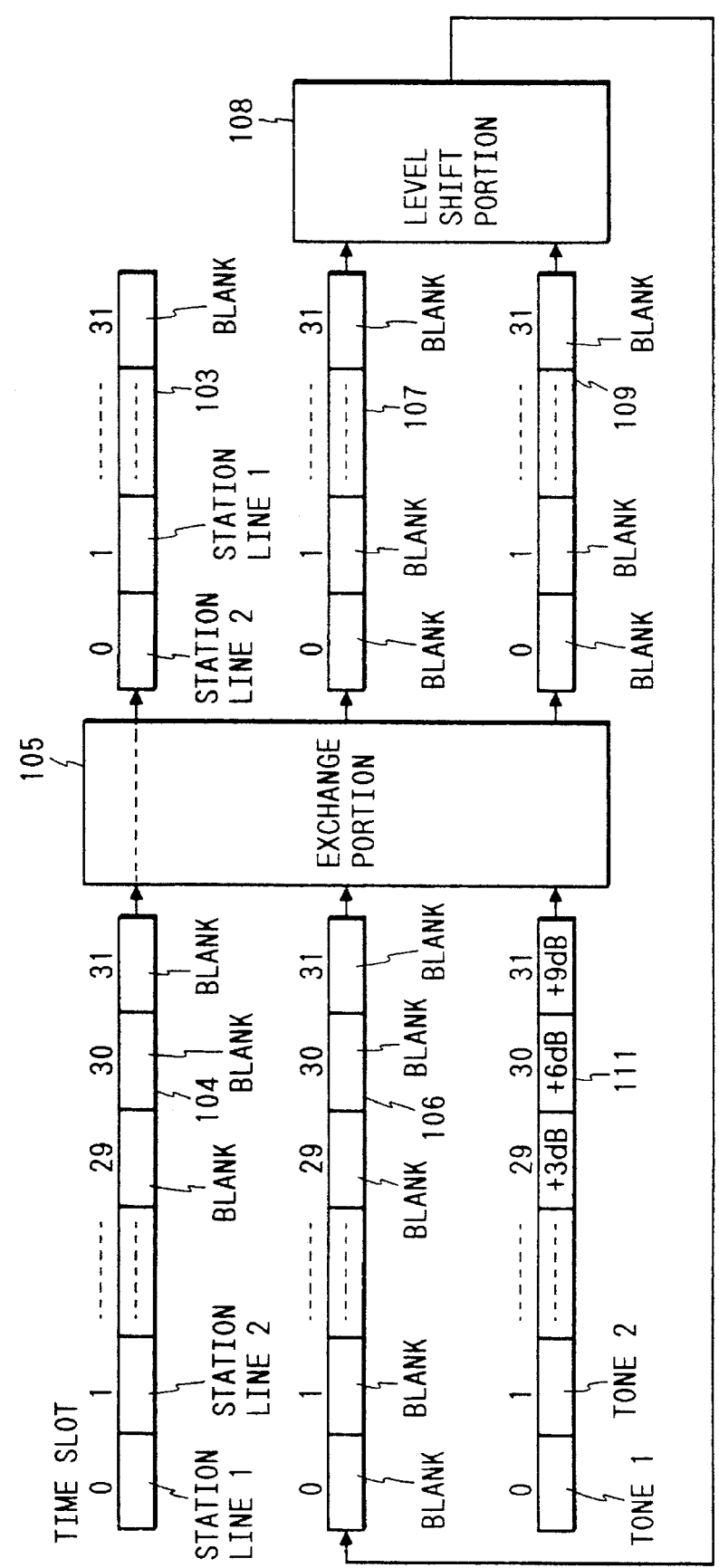
FIG. 17 is a principle drawing of a normal exchange operation of the embodiment of FIG. 11.

FIG. 17 is a principle drawing of a normal exchange operation of this embodiment. As shown in FIG. 11, the forward PCM highway 104 is that of transmitting a speech data from the station line interface 102, consisting of 32 time slots, the speech data from the station line 101-1 is assigned and transmitted to a time slot 0, and the speech data from the station line 101-2 is assigned and transmitted to a time s lot 1. the forward PCM highway 106 s transmitted from the level shift portion 108, and since the level shift portion 108 is not used at the time of normal operation, the 32 time slots are left all blank. the forward PCM highway 111 is a data string from the tone generating portion 110, data loaded in the tone memory 301 are read out sequentially, tone 1 in the time slot 0, tone 2 in the time slot 1, . . . , +3 dB indicating signal (00H) in the time slot 29, +6 dB indicating signal (01H) in the time slot 30, and +9 dB indicating signal (10H) in the time slot 31 are transmitted to the exchange portion 105 each.

In this embodiment the station line 101-1 and the station line 101-2 are used for transmission. the backward PCM highway 103 is transmitted to the station line interface 102, and the time slot 0 is that being sent to the station line 101-1, the speech data from the station line 101-2 being assigned thereto. the time slot 1 is that being sent to the station line 101-2, and the speech data from the station line 101-1 is assigned thereto. then both the backward PCM highways 107 and 109 do not use a level shift function, the time slots 0 to 31 are left blank.

Thus, at the time of normal operation, namely the level shift function being not used, the exchange portion 5 connects the time slot 0 of the forward PCM highway 104 and the time slot 1 of the backward PCM highway 103, and also connects the time slot 1 of the forward PCM highway 104 and the time slot 0 of the backward PCM highway 103.

Figure 18:
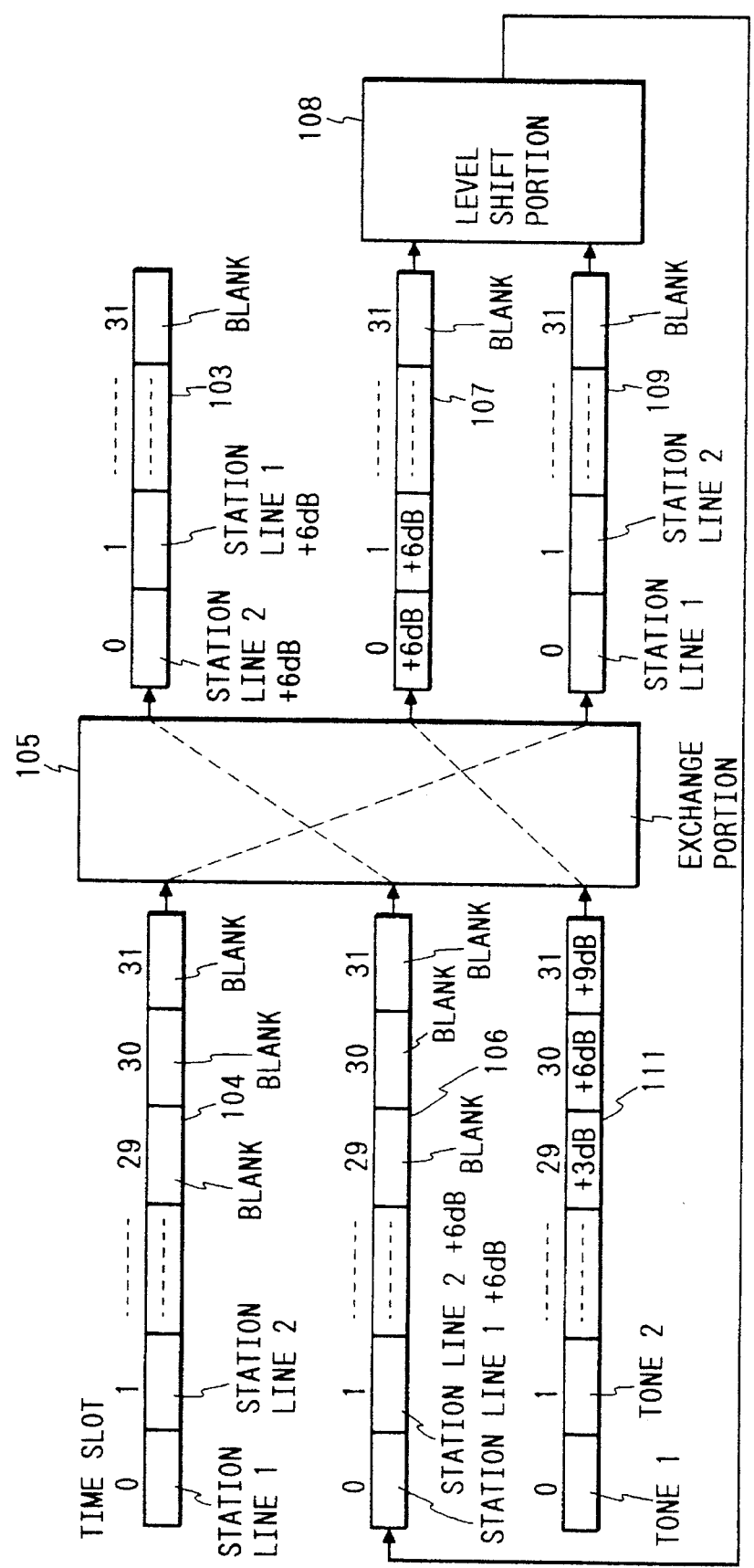
FIG. 18 is a principle drawing of an exchange operation at the time of level shift function of the embodiment of FIG. 11.

FIG. 18 represents how the level shift function of this embodiment works. the forward PCM highway 104 is similar to that at the time of normal operation of FIG. 17.

In the embodiment a line loss between the station lines 101-1 and 101-2 is 6 dB, therefore, the central control portion 113 increases a sound level of the station line 101-1 and the station line 101-2 by +6 dB to secure a normal speech quality at the time of transfer operation from the station line 101-1 to the station line 101-2.

The exchange portion 105 first connects a speech data from the station line 101-1 of the time slot 0 of the forward PCM highway 104 to the time slot 0 of the backward PCM highway 109 under control of the central control portion 113, and also connects a speech data from the station line 101-2 of the time slot 1 of the forward PCM highway 104 to the time slot 1 of the backward PCM highway 109. Further, at the time of transfer from the station line 101-1 to the station line 101-2, the central control portion 113 controls the exchange portion 105, and connects the +6 dB indicating signal (01H) of the time slot 30 of the forward PCM highway 111 to the time slots 0 and 1 of the backward PCM highway 107.

The level shift portion 108 specifies an address of the level shift memory 500, as described thereinbefore, by a data of the backward PCM highway 107 and a PCM data of the backward PCM highway 109, and outputs a PCM data corresponding thereto. the time slot 0 of the backward PCM highway 107, the time slot 0 of the backward PCM highway 109, the time slot 1 of the backward PCM highway 107 and the time slot 1 of the backward PCM highway 109 are inputted each to the level shift portion 108. Thus, a +6 dB area on the level shift memory map of FIG. 16 is specified, and a data of the address corresponding to the inputted PCM sign is outputted to the forward PCM highway 106. That is, a speech data from the station line 101-1 which is leveled up by +6 dB is allocated to the time slot 0 of the forward PCM highway 106, and a speech data from the station line 101-2 which is leveled up by +6 dB is allocated to the time slot 1. Next, the time slot 0 of the forward PCM highway 106 and the time slot 1 of the backward PCM highway 103 are connected together, the time slot 1 of the forward PCM highway 106 and the time slot 0 of the backward PCM highway 103 are connected together, and these are transmitted to the station line interface 102.

Accordingly, a sound from the station line 101-1 is leveled up by +6 dB and sent to the station line 101-2, and a sound from the station line 101-2 is leveled up by +6 dB and sent to the station line 101-1.

Further, to keep a level change of other station lines 101-3 and 101-4 at +3 dB, the central control portion 113 connects, while not so indicated in the illustration, the time slot 2 of the forward PCM highway 104 (a sound from the station line 101-3) and the time slot 3 (a sound from the station line 101-4) to the time slot 2 of the backward PCM highway 109 and the time slot 3 respectively, and also connects the +3 dB indicating signal of the time slot 29 of the forward PCM highway 111 to the time slots 2 and 3 of the backward PCM highway 107.

Accordingly, the level shift portion 108 sends the sound of the station line 101-3 which is leveled up by +3 dB to the time slot 2 of the forward PCM highway 106, and also sends the sound of the station line 101-4 which is leveled up by +3 dB to the time slot 3. Further, an exchange operation is also carried out by the exchange portion 105 likewise, thus the time slot 2 of the forward PCM highway 106 is connected to the time slot 3 of the backward PCM highway 103 (a sound to the station line 101-4), the time slot 3 of the forward PCM highway 106 is connected to the time slot 2 of the backward PCM highway 103 (a sound to the station line 101-3), and sounds leveled up by +3 dB from the sounds inputted from each station line are sent to other station lines. Thus, level change conditions of the station lines 101-1, 2 and the station lines 101-3, 4 can easily be changed.

Then, instead of an automatic measurement by the station line interface, a line loss on the station lines will be obtained by means of measuring apparatus manually, and the result may be inputted from a terminal (special telephone set) of the telephone exchange 100 to notify the central control portion 113 thereof.

Further, a data for indicating amplification degree may be generated otherwise from a special generating portion other than the tone generating portion 110. In such case, the amplification degree indicating data may be sent to the level shift portion 108 not through the exchange portion 105. That is, for example, the central control portion 113 may write the amplification degree data directly into the exchange portion 105.

Then, it can be applied to the case there a destination level from the station line 101 to the extension telephone set 119 is controlled. In this case, an incoming sound to the exchange portion 105 may be sent to the extension telephone set 119 again from the exchange portion 105 through the level shift portion 108.

As described above, according to this embodiment, since levels variant at every circuits can be exchanged, a uniform speech quality may be provided without a complicate operation for control.

Figure 19:
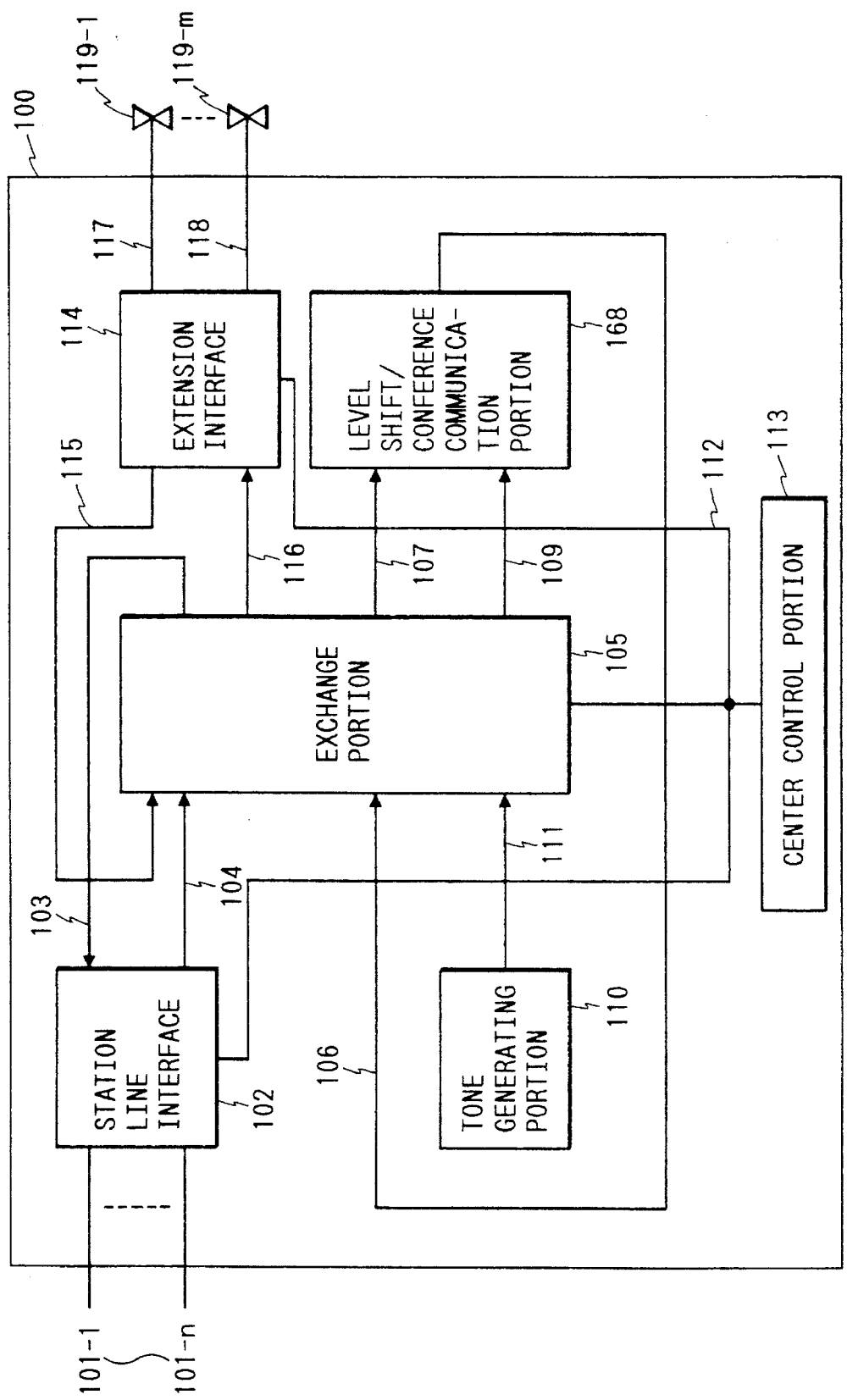
FIG. 19 is a block diagram of a main equipment of still further embodiment.

FIG. 19 is a block diagram representing a construction of another embodiment of this invention.

In this embodiment, a code for specifying an arbitrary gain or loss level, and a PCM code of communication sound of an arbitrary time slot are inputted concurrently to the level shift/conference communication portion 108. Then, the level shift/conference communication portion 108 assigns the PCM code of communication sound which is amplified correspondingly to a level specifying code to an arbitrary time slot, thereby realizing an arbitrary level conversion at every time slots.

In FIG. 19, like reference numerals represent common components of FIG. 11. A reference numeral 168 denotes a level shift/conference communication portion.

Figure 20:
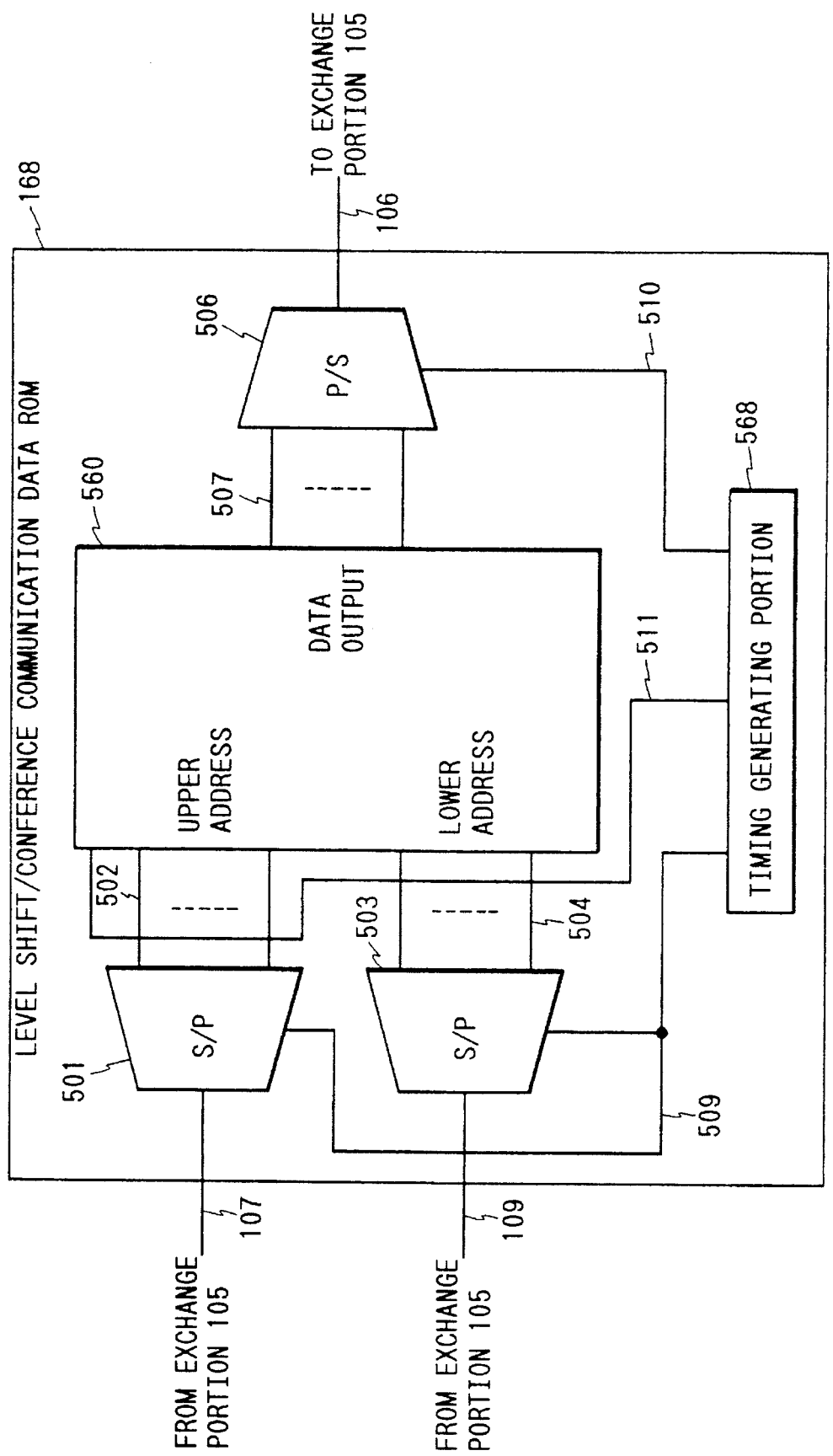
FIG. 20 is a block diagram of a level shift/conference communication portion of the embodiment of FIG. 19.

FIG. 20 is a block diagram representing a configuration of the level shift/conference communication portion 168 of this embodiment. the signal line 502 from the serial/parallel converter 501 and a signal line 511 from a timing generating portion 568 are connected to an upper address of a level shift/conference communication data ROM (read-only memory) 560. A clock outputted by the timing generating portion 568 is also supplied to the tone generating portion 110, the exchange portion 105 and others for timing adjustment. the backward PCM highway 107 is connected to a serial input of the serial/parallel converter 501. the serial/parallel converter 503 is connected to a lower address of the level shift/conference communication data ROM 560 through the signal line 504, and the backward PCM highway 109 is connected to a serial input of the serial/parallel converter 503.

A data output of the level shift/conference communication data ROM 560 is connected to the parallel/serial converter 506 through the signal line 507, and a serial output of the parallel/serial converter 506 is connected to the forward PCM highway 106. the timing generating portion 568 generates a timing clock and others for actuating the serial/parallel converters 501, 503 and 506, and supplies through the signal lines 509, 510 and 511.

A PCM data string inputted from the backward PCM highway 107 is synchronized with the timing signal 509 at every 8-bit data a serial/parallel conversion, and is inputted to an upper address of the level shift/conference communication data ROM 560. then similarly, a PCM data string inputted from the backward PCM highway 109 is synchronized with the timing signal 509 at every 8-bit data to a serial/parallel conversion, and is inputted to a lower address of the level shift/conference communication data ROM 560.

Figure 21:
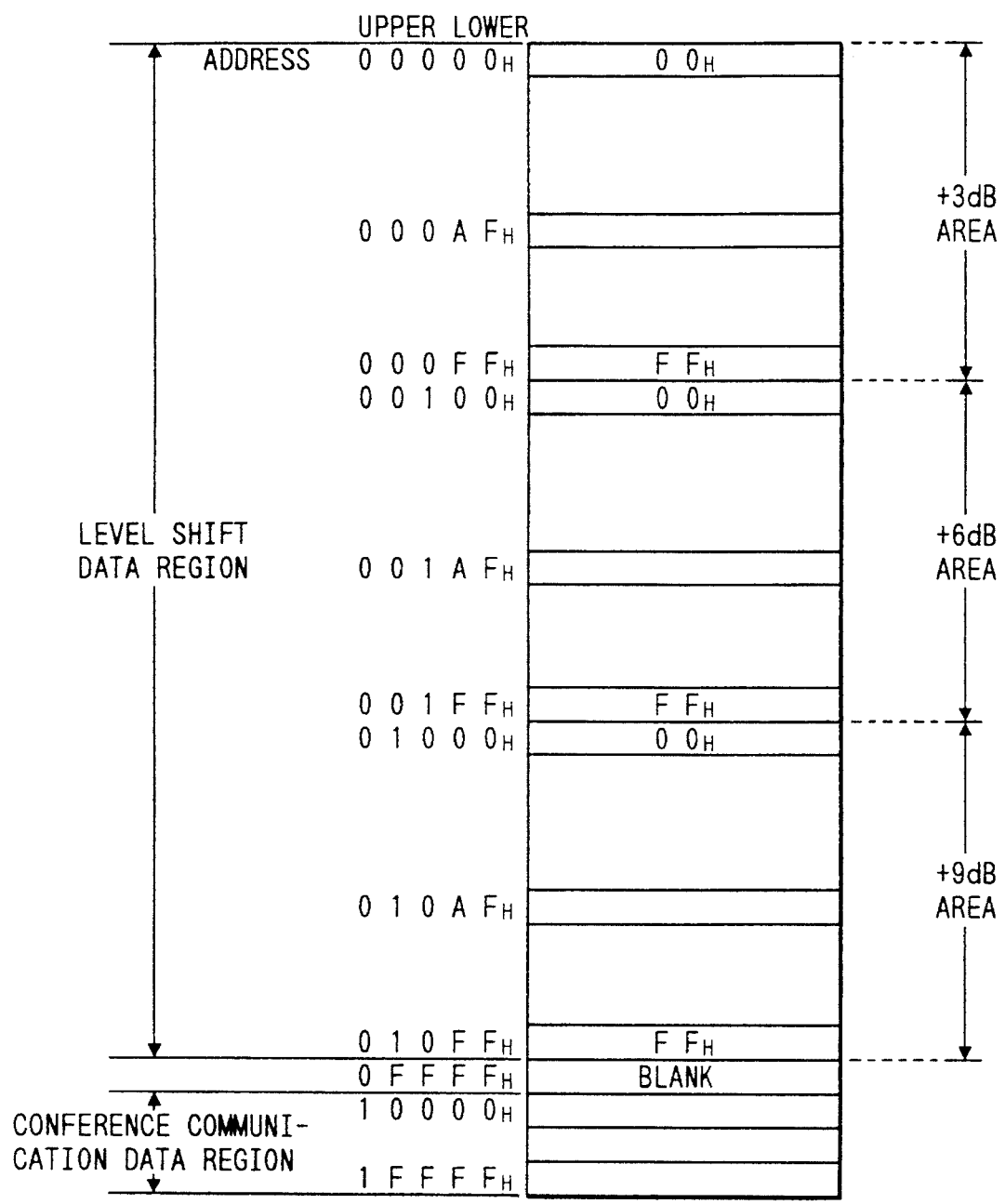
FIG. 21 is a level shift/conference communication data memory map of the embodiment of FIG. 19.

FIG. 21 shows a memory map of the level shift/conference communication data ROM 560. Addresses 00000H to 0FFFFH are intended for level shift (line loss compensation) data region, and addresses 10000H to 1FFFFH are intended for conference communication data region.

In the level shift data region, data at addresses 00000H to 000FFH are PCM signs having leveled 00H to FFH up by +3 dB respectively, arraying values obtained through √2 multiplying those of table 1a/G.711 and table 1b/G.711 according to Rule A of CCITT Recommendation G.711, or table 2a/G.711 and 2b/G.711 according to Rule μ thereof. Data at addresses 00100H to 001FFH are PCM signs having leveled 00H to FFH up by +6 dB respectively, arraying values obtained through doubling the aforementioned CCITT recommended values. Data at addresses 01000H to 010FFH are PCM signs having leveled 00H to FFH up by +9 dB, arraying likewise values obtained through 2√2 multiplying the CCITT recommended values. However, a maximum value on the positive side is 10H and a minimum value is 00H according to the Recommendation, therefore the PCM sign strings exceeding 10H or coming lower than 00H for calculation are all given at a fixed value of 10H on the positive side and 00H on the negative side.

the signal line 511 from the timing generating portion 568 is connected to the most significant bit of the ROM 560 to change the level shift data region and the conference communication data region.

Figure 22:
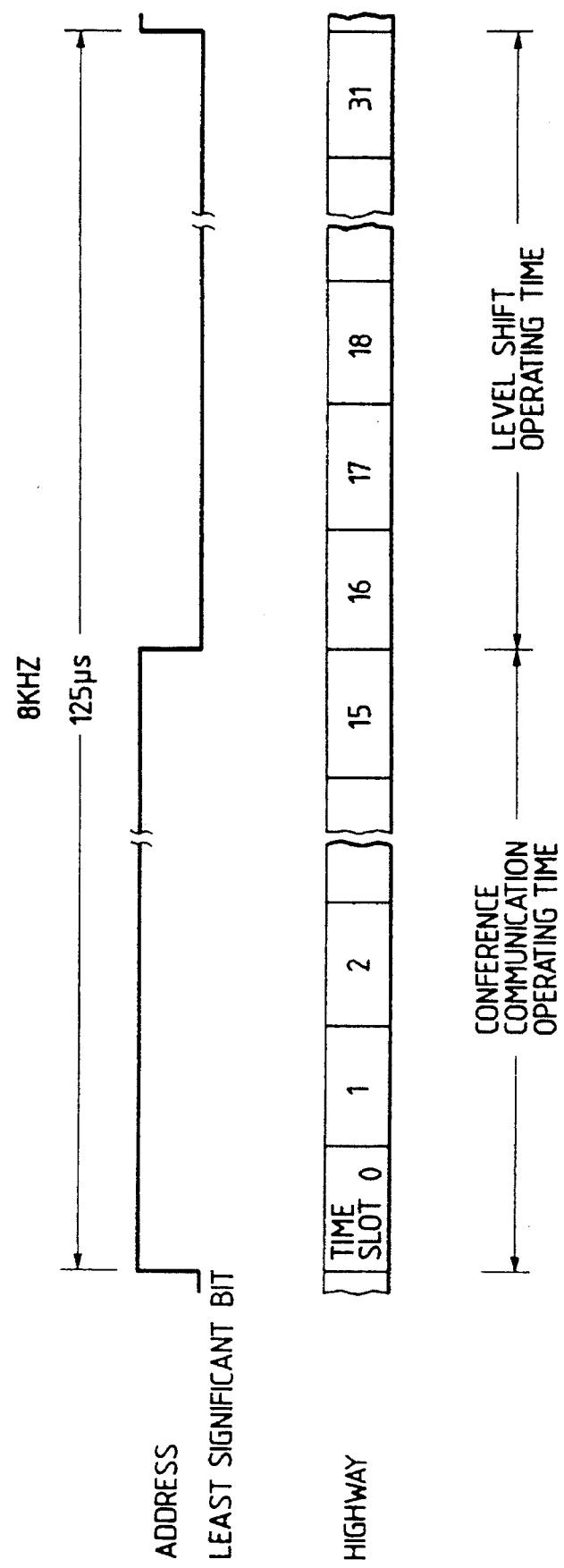
FIG. 22 is a drawing showing a relation between most significant bit and highway of the embodiment of FIG. 19.

A relation between the signal line 511 and the PCM highway is shown in FIG. 22. the signal 511 is a clock signal 8 KHz (125 μs period).

then the clock signal is high in level, that is, the most significant bit of the ROM 560 is "1", the conference communication data region is accessed, but then it is low in level, that is, the most significant bit of the ROM 560 is "0", the level shift data region is accessed. Accordingly, the 32 time slots are split into two by 8 KHz signal during a conference communication operating time and a level shift operating time, and the time slots 0 to 15 are assigned to the conference communication and the time slots 16 to 31 are assigned to the level shift.

In the conference communication operating time of the time slots 0 to 15, data inputted to an upper address of the level shift/conference communication data ROM 560 is, for example, a sound from the extension 119-1, and data inputted to a lower address is a sound from the extension 119-2. Accordingly, a data corresponding to a sound with that from the extension 119-2 added to the sound from the extension 119-1 is extracted from among the addresses 10000H to 1FFFFH, and sent to the data output line 507. then, it is converted by the parallel/serial converter 506 and outputted to the forward PCM highway 106.

In the level shift operating time of the time slots 16 to 31, data of the backward PCM highway 107 is used for changing each area of +3 dB, +6 dB or +9 dB. For leveling PCM sign $AF_H$ of the backward PCM highway 109 up by +3 dB, the upper address is made to $00_H$. That is, then data $00_H$ is inputted to the backward PCM highway, it is subjected to a parallel conversion by the serial/parallel converter 501, and the upper address of the level shift/conference communication data ROM 560 becomes $00_H$. On the other hand, the PCM sign $AF_H$ from the backward PCM highway is subjected to a parallel conversion by the serial/parallel converter 503, and the lower address of the level shift/conference communication data ROM 560 becomes $AF_H$. Accordingly, a loaded data at the address $000AF_H$ on the level shift/conference communication memory map of FIG. 21 is read out, and outputted to the data output signal line 507 of the level shift/conference communication data ROM 560. then, the data is subjected to a serial conversion by the parallel/serial converter 506 and outputted to the forward PCM highway 106.

Then, from inputting the indicating signal to the backward PCM highway 107 so as to have the upper address at $01_H$ for leveling $AF_H$ up by +6 dB and also to have the upper address at $10_H$ for leveling up by +9 dB, PCM signs up by +6 dB and +9 dB are outputted to the forward PCM highway 106 from the level shift/conference communication data ROM 560.

An operation at the time of normal exchange according to this embodiment is same as in the case of FIG. 17.

Figure 23:
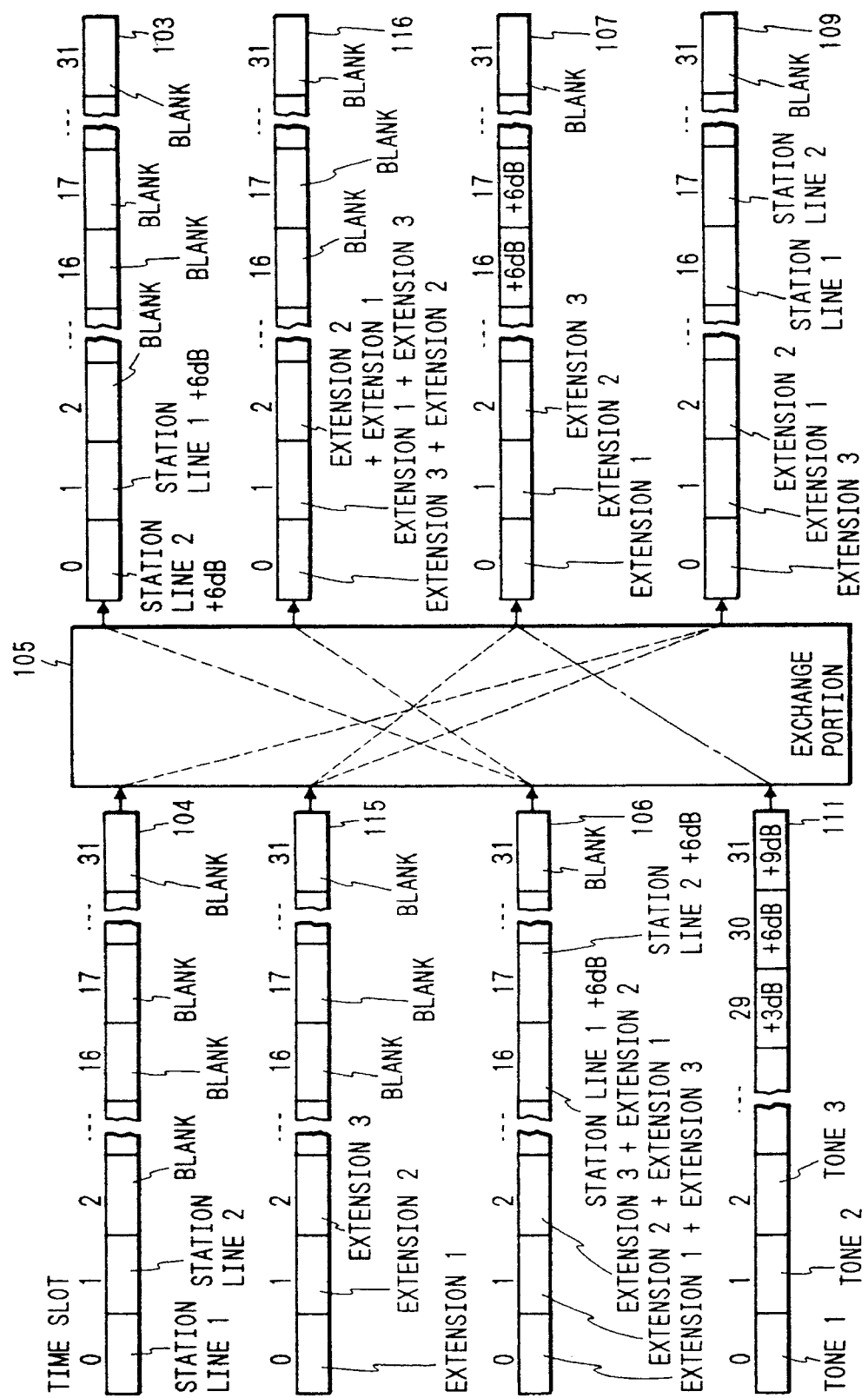
FIG. 23 is a principle drawing of an exchange operation at the time of a level shift/conference communication function of the embodiment of FIG. 19.

FIG. 23 represents a principle therein a three-party conference communication function and a level shift function according to this embodiment are in operation concurrently.

In this embodiment a description refers to the case there a conference communication is made among the extensions 119-1, 119-2 and 119-3, however, it is applicable to a four-party conference, and a construction therein extensions and outer lines are combined is also conceivable.

A sound from the extension 119-1 is assigned to the time slot 0 of the forward PCM highway 115 from the extension interface 114, a sound from the extension 119-2 is assigned to the time slot 1, and a sound from the extension 119-3 is assigned to the time slot 2. the central control portion 113 controls the exchange portion 105, connects the time slots 0, 1, 2 of the forward PCM highway 115 to the time slots 0, 1, 2 of the backward PCM highway 107, and also connects the time slot 0 of the forward PCM highway 115 to the time slot 1 of the backward PCM highway 109, the time slot 1 of the forward PCM highway 115 to the time slot 2 of the backward PCM highway 109, and the time slot 2 of the forward PCM highway 115 to the time slot 0 of the backward PCM highway 109 each in exchange. the backward PCM highways 107 and 109 are inputted to the level shift/conference communication portion 168.

In the time slots 0, 1, . . . , the signal line 511 is "1", coming in the conference communication operating time, as shown in FIG. 22, data with the PCM data of each time slot added therefor is sent to the forward PCM highway from the level shift/conference communication portion 108. That is, a sound (extension 119-1+extension 119-3) is placed on the time slot 0 of the forward PCM highway 106, a sound (extension 119-2+extension 110-1) is placed on the time slot 1, and a sound (extension 119-3+extension 119-2) is placed on the time slot 2. the central control portion 113 controls the exchange portion 105, connects the time slot 0 of the forward PCM highway 106 to the time slot 1 of the backward PCM highway 116, the time slot 1 of the forward PCM highway 106 to the time slot 2 of the backward PCM highway 116, and the time slot 2 of the forward PCM highway 106 to the time slot 0 of the backward PCM highway 116 each in exchange.

The time slot 0 of the backward PCM highway 16 is sent to the extension 119-1, the time slot 1 is sent to the extension 119-2 and the time slot 2 is sent to the extension 119-3.

That is, the sound (extension 119-3+extension 119-2) is sent to the extension 119-1, the sound (extension 119-1+extension 119-3) is sent to the extension 119-2, and the sound (extension 119-2+extension 119-1) is sent to the extension 119-3, therefore a conference communication is realized among the three parties of the extensions 119-1, 119-2 and 119-3.

Then, the forward PCM highway 104 is similar to that at the time of normal operation illustrated in FIG. 18.

In this embodiment, since a line loss between the station lines 101-1 and 101-2 is 6 dB, the central control portion 113 levels sounds of the station lines 101-1 and 101-2 up by +6 dB each so as to secure a normal speech quality at the time of transfer operation from the station line 101-1 to the station line 101-2.

Under control of the central control portion 113, the exchange portion 105 connects a speech data from the station line 101-1 of the time slot 0 of the forward PCM highway 104 to the time slot 16 of the backward PCM highway 109, and also connects a speech data from the station line 101-2 of the time slot 1 of the forward PCM highway 104 to the time slot 17 of the backward PCM highway 109. Further, then transferring from the station line 101-1 to the station line 101-2, the central control portion 113 controls the exchange portion 105, and connects a +6 dB indicating signal (01H) of the time slot 30 of the forward PCM highway 111 to the time slots 16 and 17 of the backward PCM highway 107.

As described thereinbefore, the level shift/conference communication portion 168 specifies an address of the level shift/conference communication data ROM 560 by data of the backward PCM highway 107 and PCM data of the backward PCM highway 109, and outputs a PCM data corresponding thereto. the time slot 16 of the backward PCM highway 107 and the time slot 16 of the backward PCM highway 109, the time slot 17 of the backward PCM highway 107 and the time slot 17 of the backward PCM highway 109 are inputted each to the level shift/conference communication portion 108. In the time slots 16, 17, . . . , the signal line 511 shown in FIG. 22 is "0", thus coming in a level shift operating time.

Consequently, the +6 dB area on the level shift/conference communication data memory map of FIG. 21 is specified, and a data of the address corresponding to the inputted PCM sign is outputted to the forward PCM highway 106. That is, a speech data from the station line 101-1 which is leveled up by +6 dB is allocated to the time slot 16 of the forward PCM highway, and a speech data from the station line 101-2 which is leveled up by +6 dB is allocated to the time slot 17. Next, the time slot 16 of the forward PCM highway 106 and the time slot 1 of the backward PCM highway 103 are connected together, the time slot 17 of the forward PCM highway and the time slot 0 of the backward PCM highway 103 are connected together, and transmitted to the station line interface 102.

Accordingly, a sound from the station line 101-1 is leveled up by +6 dB and sent to the station line 101-2, and a sound from the station line 101-2 is leveled up by +6 dB and sent to the station line 101-1.

Further, to keep a level change of other station lines 101-3 and 101-4 at +3 dB, the central control portion 113 connects, while not indicated so in the illustration, the time slot 2 (sound from the station line 101-3) and the time slot 3 (sound from the station line 101-4) of the forward PCM highway 104 to the time slot 18 and the time slot 19 of the backward PCM highway 109 respectively, and also connects the +3 dB indicating signal of the time slot 29 of the forward PCM highway 111 to the time slots 18 and 19 of the backward PCM highway 107.

Accordingly, the level shift/conference communication portion 168 sends a sound with the sound of the station line 101-3 leveled up by +3 dB therefor to the time slot 18 of the forward PCM highway 106, and a sound with the sound of the station line 101-4 leveled up by +3 dB therefor to the time slot 19. Further, an exchange operation is performed likewise by the exchange portion 105, the time slot 18 of the forward PCM highway 106 is connected to the time slot (sound to the station line 101-4) of the backward PCM highway 103, the time slot 19 of the forward PCM highway 106 is connected to the time slot 2 (sound to the station line 101-3) of the backward PCM highway 103, thus the sounds are leveled up by 3 dB from those inputted from each station line and sent to other station lines. Level change conditions of the station lines 101-1, 2 and the station lines 101-3, 4 can thus easily be changed.

Then, instead of an automatic measurement by the station line interface, a line loss on the station lines will be obtained by means of measuring apparatus manually, and the result may be inputted from a terminal (special telephone set) of the telephone exchange to notify the central control portion 113 thereof.

Further, a data for indicating amplification degree may be generated otherwise from a special generating portion other than the tone generating portion 110. In such case, the amplification degree indicating data may be sent to the level shift portion 108 not through the exchange portion 105. That is, for example, the central control portion 113 may write the amplification degree data directly into the exchange portion 105.

Then, it can be applied to the case there a destination level from the station line 101 to the extension telephone set 119 is controlled. In this case, an incoming sound to the exchange portion 105 may be sent to the extension telephone set 119 again from the exchange portion 105 through the level shift/conference communication portion 168.

Meanwhile, then the level shift is carried out in one stage only, a signal for indicating the amount of shift is not particularly required.

Then, the level shift and the conference communication will not necessarily be changed at an upper address, and thus may be changed at a lower address. the amount of shift may be changed likewise.

As described above, in the embodiment, a table conversion data for the conference communication and a table conversion data for adjusting the sound level are registered in the memory 560. Then, a plurality of speech data to be synthesized are supplied to the memory 560 through the backward PCM highway, and a speech data synthesized through table conversion by the memory 560 is outputted.

Then, the speech data to be subjected to a level control is supplied to the memory 560 through the backward PCM highway common with that at the time of conference communication, and a speech data having the level controlled through table conversion by the memory 560 is outputted.

Further, at the time of conference communication, a signal for specifying a conference communication is supplied to the memory 560 from the timing generating portion 568 through the signal line 511 together with a signal for specifying a speech synthesis, and on the other hand, at the time of level control, a signal for specifying level control is supplied to the memory 560 from the timing generating portion 568, thereby realizing a supply of the signals to the memory 560 through the common backward PCM highway at the time of conference communication and level control.

Accordingly, number of address terminals and data terminals and wiring patterns are economized, an occupied area for packaging is also economized, thus realizing requirements for miniaturization and cost reduction.

As described above, according to this embodiment, a further miniaturized and economical system can be provided by storing data for sound level control and data for conference communication in the common memory 560.

While the invention has been described in its preferred embodiments, the invention is not necessarily limited to a construction of the above-described embodiments, and thence various modifications may be made within the scope of the appended claims.

We claim:

1. A volume controller, comprising:

speech data input means for inputting speech data according to a signal supplied via one of a plurality of external lines;

changing means for changing a volume of the inputted speech data according to volume control data, and for outputting the volume changed speech data to another one of the plurality of external lines; and control data supply means for supplying said changing means with the volume control data corresponding to said one of the plurality of external lines through which the signal is supplied and said another one of the plurality of external lines to which the volume changed speech data is to be outputted.

2. The volume controller according to claim 1, therein said conversion means has a memory for which a read-out position is specified according to the inputted speech data and the inputted volume control data.

3. The volume controller according to claim 1, wherein said conversion means has a memory to which the inputted speech data and the inputted volume control data are inputted in parallel.

4. The volume controller according to claim 1, wherein said changing means comprises a memory for subjecting the volume of the inputted speech data to a table conversion.

5. The volume controller according to claim 1, wherein said conversion means converts a volume of the inputted speech data in the amount of shift according to said volume control data.

6. A telephone exchange, comprising:

exchange means; and changing means for changing a volume of an inputted sound, wherein said exchange means sends a sound inputted from a first external channel to said changing means, and outputs the sound having a volume changed by said changing means to a second external channel, and said changing means changes the volume of the inputted sound according to addresses in said exchange means to which the first and second external channels are connected.

7. The telephone exchange according to claim 6, wherein said first channel is one through which a sound from a talker is inputted, and said second channel is one through which a sound received by a listener is outputted.

8. The telephone exchange according to claim 6, therein said conversion means has a memory for subjecting a volume of the inputted sound to a table conversion.

9. A telephone exchange, comprising:

exchange means for connecting a plurality of external lines;

generating means for generating volume control data according to addresses in said exchange means to which a first of the plurality of external lines for inputting speech data and a second of the plurality of external lines for outputting the speech data are connected; and changing means for changing a volume of the speech data according to the volume control data.

10. The telephone exchange according to claim 9, wherein said exchange means exchanges the speech data converted by said conversion means.

11. The telephone exchange according to claim 9, wherein said exchange means supplies the volume control data to said conversion means.

12. The telephone exchange according to claim 9, wherein said changing means comprises a memory for subjecting the volume of the supplied speech data to a table conversion.

13. A method for transferring a sound from a first circuit to a second circuit by determining a level of sound from the first circuit according to a level augmenter, comprising:

a step for sending a reference signal to the first circuit;

a step for receiving the reference signal from the second circuit by the first circuit; and a step for calculating the level augmenter according to the reference signal received from the second circuit.

14. The method for transferring a sound from a first circuit to a second circuit according to claim 13, therein the reference signal is sent from the first circuit to the second circuit after a dial signal of the second circuit is sent from the first circuit in said sending step.

15. The method for transferring a sound from a first circuit to a second circuit according to claim 13, wherein a connected state of the circuits is restored after the level augmenter is calculated in said calculating step.

16. A call transfer apparatus comprising:

connecting means for connecting a plurality of lines; and changing means for changing a volume of a signal from a first line and outputting the volume changed signal to a second line, wherein said changing means changes the volume of the signal according to addresses in said connecting means to which the first and second lines are connected.

17. An apparatus according to claim 16, therein said changing means comprises a memory table for converting the signal.

18. A telephone apparatus comprising:

memory means for storing, at positions corresponding to switch data and first speech data, data obtained by changing a volume of the first speech data, and for storing, at positions corresponding to the switch data, second speech data and the third speech data, data obtained by adding the second and the third data to each other, therein selection data is supplied for switching a volume change mode and a conference mode; and supply means for selectively supplying said memory means with the switch data and the first speech data, or the switch data, the second speech data and the third speech data.

19. An apparatus according to claim 18, wherein said supply means has exchange means for exchanging lines, and supplies said memory means with the first, second and third speech data from the lines.

* * * * *

UNITED STATES PATENT AND TRADEMARK OFFICE
CERTIFICATE OF CORRECTION

PATENT NO. : 5,515,430

DATED : May 7, 1996

INVENTORS : ISAMU OZAWA ET AL.

It is certified that error appears in the above-identified patent and that said Letters Patent is hereby corrected as shown below:

ON THE Title page, item

[56] U.S. Patent Documents

"4,955,071  2/1991 Weber et al." should read
--4,995,071  2/1991 Weber et al.--.

Foreign Patent Documents

"122169  9/1989 Japan" should read --1-212169
8/1989 Japan--.

COLUMN 1

Line 24, "$2/4$" should read --2/4--.

COLUMN 3

Line 23, "2,048 MHz" should read --2.048 MHz--;
Line 44, "8 KHz" should read --8 kHz.--;
Line 48, "8 KHz" should read --8 kHz--.

UNITED STATES PATENT AND TRADEMARK OFFICE
CERTIFICATE OF CORRECTION

PATENT NO. : 5,515,430

DATED : May 7, 1996

INVENTORS : ISAMU OZAWA ET AL.

It is certified that error appears in the above-identified patent and that said Letters Patent is hereby corrected as shown below:

COLUMN 5

Line 37,   "2,048 MHz" should read --2.048 MHz--;
   Line 59,   "convenience" should read --convenience'--.

COLUMN 6

Line 3,    "256 KHz" should read --256 kHz--;
   Line 8,    "256 KHz" should read --256 kHz--;
   Line 19,   "number" should read --number 2--;
   Line 23,   "converters" should read --converters 12--.

COLUMN 7

Line 28,   "s lot" should read --slot--;
   Line 39,   "slots." should read --slot.--;
   Line 53,   "slots." should read --slot.--;
   Line 60,   "(8 KHz" should read --(8 kHz--.

UNITED STATES PATENT AND TRADEMARK OFFICE
CERTIFICATE OF CORRECTION

PATENT NO. : 5,515,430

DATED : May 7, 1996

INVENTORS : ISAMU OZAWA ET AL.

It is certified that error appears in the above-identified patent and that said Letters Patent is hereby corrected as shown below:

COLUMN 9

Line 20, "1.5 KHz," should read --1.5 kHz,--;
Line 22, "1.5 KHz," should read --1.5 kHz;
Line 40, "$L_\ell=(|L2|-L_1|)/2$" should read
--$L_\ell=(|L_2|-|L_1|)/2$--.

COLUMN 10

Line 32, "8 KHz." should read --8 kHz.--.

COLUMN 11

Line 14, "the" (first occurrence) should read --The--;
Line 46, "s lot" should read --slot--;
Line 47, "the" (first occurrence) should read --The--;
and "106 s" should read --106 is--;
Line 50, "the" should read --The--;

UNITED STATES PATENT AND TRADEMARK OFFICE
CERTIFICATE OF CORRECTION

PATENT NO. : 5,515,430

DATED : May 7, 1996

INVENTORS : ISAMU OZAWA ET AL.

It is certified that error appears in the above-identified patent and that said Letters Patent is hereby corrected as shown below:

COLUMN 11

Line 63,   "the" (first occurrence) should read --The--;
   Line 65,   "then" should read --When--.

COLUMN 12

Line 8,   "the" should read --The--;
   Line 33,   "the" (first occurrence) shoud read --The--.

COLUMN 13

Line 46,   "slots." should read --slot.--;
   Line 52,   "the" (first occurrence) should read --The--;
   Line 59,   "the" should read --The--;
   Line 60,   "the" (second occurrence) should read --The--.

COLUMN 14

Line 3,   "the" should read --The--;
   Line 10,   "then" should read --Then--;

UNITED STATES PATENT AND TRADEMARK OFFICE
CERTIFICATE OF CORRECTION

PATENT NO. : 5,515,430

DATED : May 7, 1996

INVENTORS : ISAMU OZAWA ET AL.

It is certified that error appears in the above-identified patent and that said Letters Patent is hereby corrected as shown below:

COLUMN 14

```
Line 38,  "the" (first occcurrence) should read --The--;
Line 43,  "the" should read --The--;
Line 44,  "8 KHz" should read --8 kHz--;
Line 45,  "then" should read --When--;
Line 47,  "then" should read --when--;
Line 50,  "8 KHz" should read --8 kHz--;
Line 63,  "then," should read --Then,--.
```

COLUMN 15

```
Line 3,   "Then" should read --when--;
Line 16,  "then" should read --Then,--;
Line 27,  "therein" should read --wherein--;
Line 39,  "the" (second occurrence) should read
          --The--;
Line 48,  "the" should read --The--;
Line 56,  "119-1+extension" should read --119-1 +
          extension--;
```

UNITED STATES PATENT AND TRADEMARK OFFICE
CERTIFICATE OF CORRECTION

PATENT NO. : 5,515,430

DATED : May 7, 1996

INVENTORS : ISAMU OZAWA ET AL.

It is certified that error appears in the above-identified patent and that said Letters Patent is hereby corrected as shown below:

COLUMN 15

Line 58, "119-2+extension" should read --119-2 + extension--;
Line 59, "119-3+extension" should read --119-3 + extension;
Line 60, "the" (second occcurrence) should read --The--.

COLUMN 16

Line 4, "119-3+extension" should read --119-3 + extension--;
Line 7, "119-2+extension" should read --119-2 + extension--;
Line 32, "thereinbefore," should read hereinbefore,--;
Line 37, "the" (first occurrence) should read --The--.

UNITED STATES PATENT AND TRADEMARK OFFICE
CERTIFICATE OF CORRECTION

PATENT NO. : 5,515,430

DATED : May 7, 1996

INVENTORS : ISAMU OZAWA ET AL.

It is certified that error appears in the above-identified patent and that said Letters Patent is hereby corrected as shown below:

COLUMN 17

Line 47, "the" should read --The--.

COLUMN 18

Line 14, "thence" should read --hence--;
Line 32, "therein" should read --wherein--;
Line 64, "therein" should read --wherein--.

UNITED STATES PATENT AND TRADEMARK OFFICE
CERTIFICATE OF CORRECTION

PATENT NO. : 5,515,430

DATED : May 7, 1996

INVENTORS : ISAMU OZAWA ET AL.

It is certified that error appears in the above-identified patent and that said Letters Patent is hereby corrected as shown below:

<u>COLUMN 19</u>

Line 30, "therein" should read --wherein--.

<u>COLUMN 20</u>

Line 11, "therein" should read --wherein--;
    Line 23, "therein" should read --wherein--.

Signed and Sealed this

Eighth Day of October, 1996

Attest:

BRUCE LEHMAN

*Attesting Officer*      *Commissioner of Patents and Trademarks*